(12) United States Patent  
Horn et al.

(10) Patent No.: US 9,161,357 B2
(45) Date of Patent: Oct. 13, 2015

(54) METHOD AND APPARATUS FOR WHITE SPACE OPERATION BY A MOBILE ENTITY

(71) Applicant: QUALCOMM Incorporated, San Diego, CA (US)

(72) Inventors: Gavin Bernard Horn, La Jolla, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 13/756,415

(22) Filed: Jan. 31, 2013

(65) Prior Publication Data
US 2013/0196632 A1 Aug. 1, 2013

Related U.S. Application Data

(60) Provisional application No. 61/593,792, filed on Feb. 1, 2012.

(51) Int. Cl.
| H04M 1/66 | (2006.01) |
| H04W 72/04 | (2009.01) |
| H04W 12/06 | (2009.01) |
| H04W 16/14 | (2009.01) |
| H04W 12/08 | (2009.01) |
| H04W 28/18 | (2009.01) |
| H04W 24/02 | (2009.01) |
| H04W 48/12 | (2009.01) |

(Continued)

(52) U.S. Cl.
CPC .......... *H04W 72/0433* (2013.01); *H04W 12/06* (2013.01); *H04W 12/08* (2013.01); *H04W 16/14* (2013.01); *H04W 24/02* (2013.01); *H04W 28/18* (2013.01); *H04W 48/12* (2013.01); *H04W 48/16* (2013.01); *H04W 88/08* (2013.01)

(58) Field of Classification Search
None
See application file for complete search history.

(56) References Cited

U.S. PATENT DOCUMENTS

| 8,437,790 B1 | 5/2013 | Hassan et al. |
| 2009/0034452 A1 | 2/2009 | Somasundaram et al. |

(Continued)

OTHER PUBLICATIONS

3GPP TS 36.300, "LTE; Evolved Universal Terrestrial Radio Access (E-UTRA) and Evolved Universal Terrestrial Radio Access Network (E-UTRAN); Overall description; Stage 2 (3GPP TS 36.300 version 10.5.0 Release 10)", Technical Specification, European Telecommunications Standards Institute (ETSI), 650, Route Des Lucioles; F-06921 Sophia-Antipolis; France, vol. 3GPP RAN 2. No. V10.5.0, Nov. 1, 2011. XP014068365.

(Continued)

*Primary Examiner* — Erika A Washington
(74) *Attorney, Agent, or Firm* — Novak Druce Connolly Bove + Quigg LLP

(57) ABSTRACT

A method operable by an access point for using white space (WS) bandwidth in wireless communication service includes receiving a request to establish a connection from a mobile entity. The method further includes forwarding the request to a service authentication entity to authenticate the mobile entity for the service, and obtaining authorization for service and white space (WS) parameters for the mobile entity from the service authentication entity. The method further includes determining the connection is operating in WS; and authenticating the mobile entity for the service in the WS based at least in part on the received WS parameters. A complementary method is performed by a service authentication entity. Wireless communication apparatus are configured to perform the methods by executing instructions stored on a computer-readable medium.

26 Claims, 26 Drawing Sheets

(51) Int. Cl.
*H04W 48/16* (2009.01)
*H04W 88/08* (2009.01)

(56) References Cited

U.S. PATENT DOCUMENTS

| | | |
|---|---|---|
| 2010/0238798 A1 | 9/2010 | Ahuja et al. |
| 2010/0246506 A1 | 9/2010 | Krishnaswamy |
| 2011/0116484 A1 | 5/2011 | Henry |
| 2011/0185397 A1 | 7/2011 | Escott et al. |
| 2011/0195667 A1 | 8/2011 | Hassan et al. |
| 2011/0268095 A1 | 11/2011 | Kim et al. |
| 2011/0280228 A1* | 11/2011 | McCann et al. ............. 370/338 |
| 2011/0317019 A1 | 12/2011 | Bahl et al. |
| 2012/0063373 A1 | 3/2012 | Chincholi et al. |
| 2012/0163252 A1 | 6/2012 | Ahn et al. |
| 2012/0230250 A1 | 9/2012 | Kasslin et al. |
| 2012/0233635 A1 | 9/2012 | Hakola et al. |
| 2012/0281594 A1 | 11/2012 | Stewart et al. |
| 2012/0282942 A1 | 11/2012 | Uusitalo et al. |
| 2013/0156005 A1 | 6/2013 | Li et al. |
| 2013/0195054 A1* | 8/2013 | Horn et al. .................... 370/329 |

OTHER PUBLICATIONS

International Search Report and Written Opinion—PCT/US2013/024519—ISA/EPO—May 14, 2013.

"LTE; Telecommunication management; Home enhanced Node B (HeNB) Operations, Administration, Maintenance and Provisioning (OAM&P); Procedure flows for Type 1 interface HeNB to HeNB Management System (HeMS) (3GPPTS 32.593 version 10.2.0 Release 10)", Technical Specification, European Telecommunications Standards Institute (ETSI), 650, Route Des Lucioles ; F-06921 Sophia-Antipolis ; France, vol. 3GPP SA 5, No. V10.2.0, Oct. 1, 2011, XP014068330.

Probasco S., et al., "Protocol to Access White Space database: PS, use cases and rqmts; draft-ietf-paws-problem-stmt-usecases-rqmt s-02. txt", Protocol to Access White Space Database: PS. Use Cases and rqmts; draft-ietf-paws-problem-stmt-usecases-rqmt s-02.txt, Internet Engineering Task Force. IETF; Standardworkingdraft, Internet Society (I Soc) 4, Rue Des Falaises CH-1205 Geneva, Switzerlan, Jan. 27, 2012, pp. 1-34, XP015080369.

Radisys: "LTE—Advanced in White Space—A complementary Technology", Dec. 2011, pp. 1-6, XP002695460, Retrieved from the Internet: URL:http://go.radisys.com/rs/radisys/images/paper-lte-white-space.pdf [retrieved on Apr. 15, 2013].

Radisys: "Protocol Signaling Procedures in LTE", Sep. 2011, pp. 1-11, XP002695461, Retrieved from the Internet: URL:http://go.radisys.com/rs/radisys/images/paper-lte-protocol-signaling.pdf [retrieved on Apr. 15, 2013].

* cited by examiner

METHOD AND APPARATUS FOR WHITE SPACE OPERATION BY A MOBILE ENTITY

CROSS-REFERENCE TO RELATED APPLICATION

The present application for patent claims priority to Provisional Application No. 61/593,792, filed Feb. 1, 2012, entitled "METHOD AND APPARATUS FOR WHITE SPACE OPERATION BY A MOBILE ENTITY", which application is assigned to the assignee hereof, and expressly incorporated in its entirety by reference herein.

BACKGROUND

1. Field

The present disclosure relates to wireless communication systems, and more particularly, to white space (WS) techniques in Long Term Evolution (LTE) systems.

2. Background

Wireless communication systems are widely deployed to provide various types of communication content such as voice, data, video and the like, and deployments are likely to increase with introduction of new data oriented systems, such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems and other orthogonal frequency division multiple access (OFDMA) systems.

3GPP LTE represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for a number of mobile entities, such as, for example, user equipments (UEs) or access terminals (ATs). A UE may communicate with a base station via the downlink and uplink. The downlink (or forward link) refers to the communication link from the base station to the UE, and the uplink (or reverse link) refers to the communication link from the UE to the base station. Such communication links may be established via a single-in-single-out, multiple-in-signal-out, or a multiple-in-multiple-out (MIMO) system.

As the number of entities deployed increases, the need for proper bandwidth utilization on licensed as well as RF spectrum for which the cellular operator is not licensed or holds only a secondary license, including whitespace spectrum, becomes more important. In the context of cognitive radio networks, certain frequency bands may be underutilized by an incumbent primary licensee. Such frequency bands may be made available to secondary users (e.g. cellular operators) when the primary user is not active. Due to changes in primary and/or secondary user activity, changing the operating spectrum for the secondary licensees may be necessary. In this context, there remains a need for efficient authentication and authorization of wireless devices serviced by cellular operators in cognitive LTE networks and/or similar wireless communication networks.

SUMMARY

Methods, apparatus and systems for wireless communication service using whitespace spectrum are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method operable by an access point for wireless communication service may include receiving a request to establish a connection from a mobile entity. The request may include an indication for a backhaul or an access connectivity, and/or a request for a Long Term Evolution (LTE) connection establishment. In another aspect, the received request may include at least one of a service request, a tracking area update (TAU), and an attach request message.

The base station may be, or may include, a macrocell eNB, a femtocell, a picocell, or a UE eNB, and may operate in at least one whitespace (WS) radio band and at least one non-WS radio band (i.e., in both WS and non-WS). The base station may be operated by a primary licensee of the at least one non-WS band, which is a secondary licensee of the at least one WS band. The base station and access point may operate in a cognitive LTE network.

The method may further include forwarding the request to a service authentication entity to authenticate the mobile entity for the service, for example, to a Mobility Management Entity (MME). In an aspect, the forwarded request may include at least one of (a) a request for the WS parameters for the mobile entity; (b) an indication that the mobile entity requests to operate in the WS; and (c) an indication that the mobile entity is capable of operating in the WS.

The method may further include obtaining authorization for service and white space (WS) parameters for the mobile entity from the service authentication entity. The obtained parameters may include an identifier for the at least one WS band. The method may further include determining the connection is operating in WS, and authenticating the mobile entity for the service in the WS based at least in part on the received WS parameters. In other aspects, the method may include forwarding the WS parameters to a target eNB during a handover.

In another aspect, a method operable by a network entity for service authentication in a wireless communication service may include receiving a request from an access point to establish a connection for a mobile entity. In an aspect, the request may include an indication for a backhaul or an access connectivity. The access point may be, or may include, a base station, macrocell eNB, a femtocell, a picocell, or a UE eNB, and may operate in at least one whitespace (WS) radio band and at least one non-WS radio band (i.e., in both WS and non-WS). The network entity may be, for example, a MME or other service authentication entity.

The method by the service authentication entity may further include authenticating the mobile entity for the service. In an aspect, the authenticating may include determining the request includes access to white space (WS). In a more detailed aspect, determining the request includes access to WS may include receiving the WS parameters as part of the request, and/or performing the determining based on an identifier of the access point. The authenticating may include authenticating the mobile entity for the service in the WS based at least in part on the WS parameters.

The method by the service authentication entity may further include providing WS parameters as part of a mobile entity context to the access point, in response to authentication of the mobile entity by the service authentication entity. The provided parameters may include an identifier for the at least one WS band, which the access point may transmit for requesting the authorization information. The WS database may be operated by a network entity. In other, more detailed aspects, the mobile entity context may include subscription information for the mobile entity.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as an access point, for example a base station, eNB, macrocell, femtocell, or a network entity such as used in a core network. Similarly, an article of manufacture may be provided, including a computer-readable storage medium holding encoded instructions, which when executed by a processor, cause a computer to perform the methods and aspects of the methods as summarized above.

BRIEF DESCRIPTION OF THE DRAWINGS

FIG. 26 illustrates an example slave WSD authorization methodology executable by a Mobility Management Entity (MME) or the like.

DETAILED DESCRIPTION

Techniques for supporting cognitive radio communication are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as, for example, Universal Terrestrial Radio Access (UTRA) or cdma2000. UTRA includes Wideband CDMA (WCDMA)

and other variants of CDMA, while cdma2000 covers IS-2000, IS-95 and IS-856 standards. A TDMA network may implement a radio technology such as Global System for Mobile Communications (GSM). An OFDMA network may implement a radio technology such as, for example, Evolved UTRA (E-UTRA), Ultra Mobile Broadband (UMB), IEEE 802.16 (WiMAX), IEEE 802.20, or Flash-OFDM®. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). UMB and cdma2000 are described in documents from an organization named "3rd Generation Partnership Project 2" (3GPP2). A WLAN may implement a radio technology such as, for example, IEEE 802.11 (Wi-Fi), or HiperLAN.

The techniques described herein may be used for the wireless networks and radio technologies mentioned above as well as other wireless networks and radio technologies. For clarity, certain aspects of the techniques are described below for 3GPP network and WLAN, and LTE and WLAN terminology is used in much of the description below.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
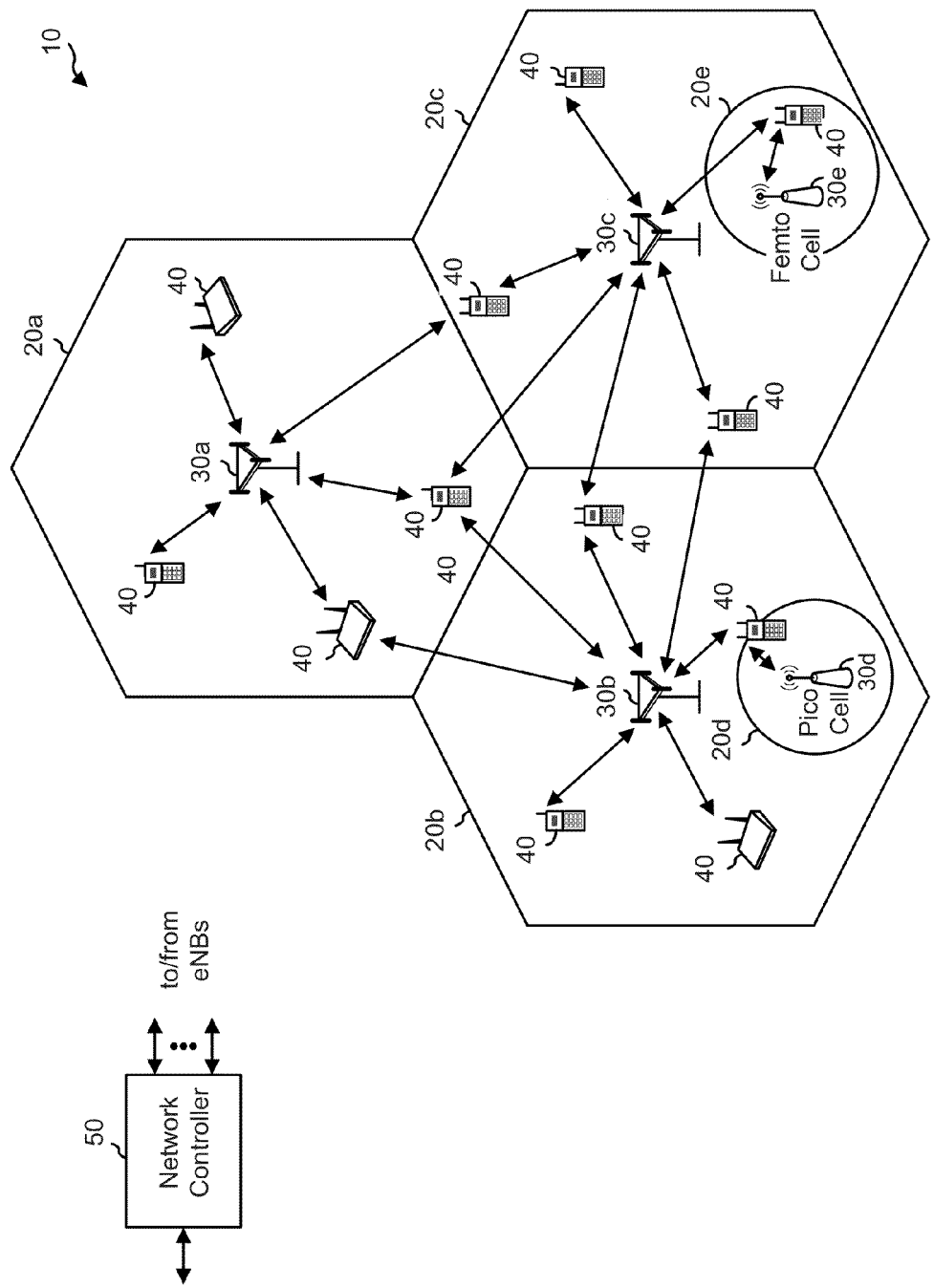
FIG. 1 is a block diagram conceptually illustrating an example of a telecommunications system.

FIG. 1 shows a wireless communication network 10, which may be an LTE network or some other wireless network. Wireless network 10 may include a number of evolved Node Bs (eNBs) 30 and other network entities. An eNB may be an entity that communicates with mobile entities (e.g., user equipment (UE)) and may also be referred to as a base station, a Node B, a macrocell, an access point, or other terminology. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macrocell, a picocell, a femtocell, and/or other types of cell. A macrocell may cover a relatively large geographic area (e.g., several kilometers in radius) and may allow unrestricted access by UEs with service subscription. A pico cell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG). In the example shown in FIG. 1A, eNBs 30a, 30b, and 30c may be macro eNBs for macrocell groups 20a, 20b, and 20c, respectively. Each of the cell groups 20a, 20b, and 20c may include a plurality (e.g., three) of cells or sectors. An eNB 30d may be a pico eNB for a pico cell 20d. An eNB 30e may be a femto eNB or femto access point (FAP) for a femtocell 20e.

Wireless network 10 may also include relays (not shown in FIG. 1A). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may be a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, or other terminology. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, or other client device. A UE may be able to communicate with eNBs, relays, and other access points or network wireless nodes. A UE may also be able to communicate peer-to-peer (P2P) with other UEs.

Wireless network 10 may support operation on a single carrier or multiple carriers for each of the downlink (DL) and uplink (UL). A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the DL carrier.

Wireless network 10 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), or similar technology. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods. In related aspects, the FAP synchronization process described in further detail below may be applied to the FAPs using FDD or TDD duplexing.

Figure 2:
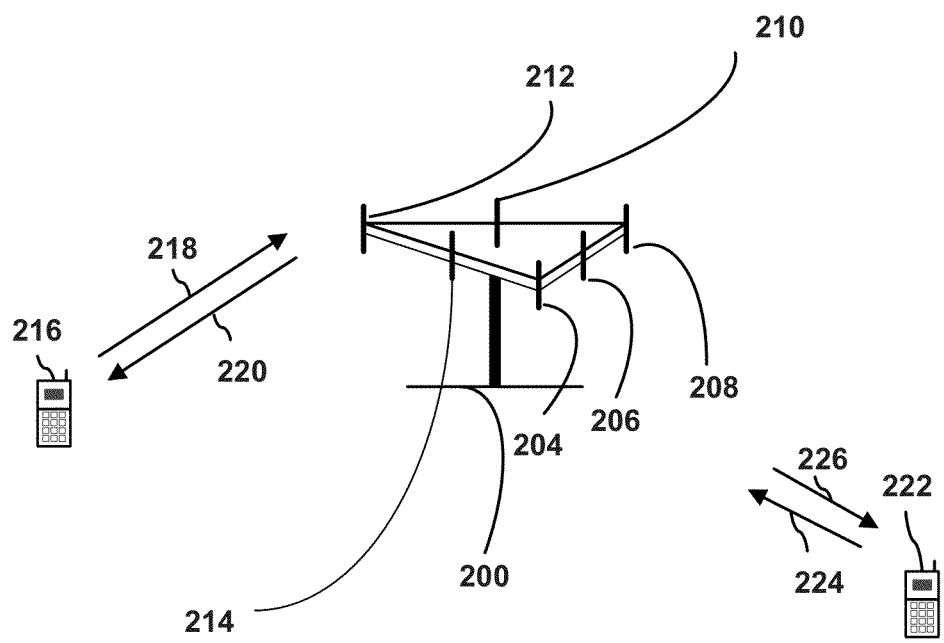
FIG. 2 illustrates details of a wireless communications system including an evolved Node B (eNB) and multiple user equipments (UEs).

Referring now to FIG. 2, a multiple access wireless communication system according to one aspect is illustrated. An access point or eNB 200 includes multiple antenna groups, one including 204 and 206, another including 208 and 210, and an additional including 212 and 214. In FIG. 2, only two antennas are shown for each antenna group, however, more or fewer antennas may be utilized for each antenna group. Access terminal or UE 216 is in communication with antennas 212 and 214, where antennas 212 and 214 transmit information to access terminal 216 over forward link 220 and receive information from access terminal 216 over reverse link 218. Access terminal 222 is in communication with antennas 206 and 208, where antennas 206 and 208 transmit information to access terminal 222 over forward link 226 and receive information from access terminal 222 over reverse link 224. In a FDD system, communication links 218, 220, 224 and 226 may use different frequencies for communication. For example, forward link 220 may use a different frequency then that used by reverse link 218.

Each group of antennas and/or the area in which they are designed to communicate is often referred to as a sector of the access point. Antenna groups each are designed to communicate to access terminals in a sector, of the areas covered by access point 200. In communication over forward links 220 and 226, the transmitting antennas of access point 200 may utilize beamforming in order to improve the signal-to-noise ratio of forward links for the different access terminals 216 and 224. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, evolved Node B (eNB) or some other terminology. An access terminal may also be called an access terminal, user equipment (UE), a wireless communication device, terminal, access terminal or some other terminology.

In accordance with aspects of the subject of this disclosure, cognitive radio refers generally to wireless communication systems where either a wireless network or network node includes intelligence to adjust and change transmission and/or reception parameters to provide efficient communication, while avoiding interference with other licensed or unlicensed users. Implementation of this approach includes active monitoring and sensing of the operational radio environment, which may include frequency spectrum, modulation characteristics, user behavior, network state, and/or other parameters. Multiple-access systems, such as LTE and LTE-A systems, may use cognitive radio techniques to utilize additional available spectrum beyond the specifically licensed spectrum.

Spectrum sensing involves detection of potentially usable spectrum. Once usable spectrum is detected, it may then be used either alone (if unoccupied) or shared, assuming other users are present, without causing harmful interference. Nodes in cognitive radio systems may be configured to sense spectrum holes, which may be based on detecting primary users (such as, for example, licensed users of the shared spectrum), or other users (such as, for example, unlicensed users). Once usable spectrum is selected, it may then be further monitored to detect use by others. For other higher priority users, the spectrum may need to vacated and communications transferred to other channels. For example, if a primary user is detected during initial search, an unlicensed user may be prohibited from using the spectrum. Likewise, if a primary user appears in spectrum being used by an unlicensed user, the unlicensed user may need to vacate.

Spectrum sensing techniques can include transmitter detection, where cognitive radio nodes have the capability to determine if a signal from a primary user is locally present in a certain spectrum. This may be done by techniques such as matched filter/correlation detection, energy or signal level detection, cyclo-stationary feature detection, or other techniques. A primary user may be a higher priority user, such as a licensed user of shared spectrum which unlicensed users may also use.

Cooperative detection may also be used in some cases where multiple network nodes are in communication. This approach relates to spectrum sensing methods where information from multiple cognitive radio users are incorporated for primary user detection. Interference-based, or other detection methods may likewise be used to sense available spectrum.

Cognitive radio systems generally include functionality to determine the best available spectrum to meet user and/or network communication requirements. For example, cognitive radios may decide on the best spectrum band to meet specific Quality of Service (QOS), data rate requirements, or other requirements over available spectrum bands. This requires associated spectrum management and control functions, which may include spectrum analysis as well as spectrum decision processing to select and allocate available spectrum.

Because the spectrum is typically shared, spectrum mobility is also a concern. Spectrum mobility relates to a cognitive network user changing operational frequency. This is generally done in a dynamic manner by allowing network nodes to operate in the best available frequency band, and maintaining seamless communications during the transition to other/better spectrum. Spectrum sharing relates to providing a fair spectrum scheduling method, which can be regarded as similar to generic media access control (MAC) problems in existing networks.

One aspect of cognitive radio relates to sharing use of licensed spectrum by unlicensed users. Use of this spectrum may be integrated with other wireless communication methodologies, such as LTE.

White space (WS) refers to frequencies allocated to a broadcasting service or other licensed user that are not used locally, as well as to interstitial bands. In the United States, the switchover to digital television in 2009 created abandoned spectrum in the upper 260 megahertz band (258 to 806 MHz), and additional WS is present at 54-258 MHz (TV Channels 2-51) which is still in use for digital television. Incumbent primary users may include licensed television broadcasters on existing channels, wireless microphone systems, medical devices, or other legacy devices. In 2008, the United States Federal Communications Commission (FCC) approved unlicensed use of this WS. However, these so-called "TV Band Devices," must operate in the vacant channels or WSs between television channels in the range of 54 to 258 MHz.

Rules defining these devices were published by the U.S. FCC in a Second Report and Order on Nov. 14, 2008. The FCC rules define fixed and personal/portable devices. Fixed devices may use any of the vacant US TV channels 2, 5-36 and 38-51 with a power of up to 1 watt (4 watts EIRP). They may communicate with each other on any of these channels, and also with personal/portable devices in the TV channels 21 through 51. Fixed devices must be location-aware, query an FCC-mandated database at least daily to retrieve a list of usable channels at their location, and must also monitor the spectrum locally once every minute to confirm that no legacy wireless microphones, video assist devices, or other emitters are present. If a single transmission is detected, the device may not transmit anywhere within the entire 6 MHz channel in which the transmission was received. Fixed devices may transmit only within the TV channels where both the database indicates operation is permissible, and no signals are detected locally.

Personal/portable stations may operate only on channels 21-36 and 38-51, with a power of 100 mW EIRP, or 40 mW if on a channel adjacent to a nearby television channel. They may either retrieve a list of permissible channels from an associated fixed station, or may accept a lower output power of 50 mW EIRP and use only spectrum sensing.

As noted previously, existing wireless networks may be enhanced by addition of cognitive radio functionality. In one aspect, an LTE system may include cognitive radio functionality as further illustrated below.

Figure 3:
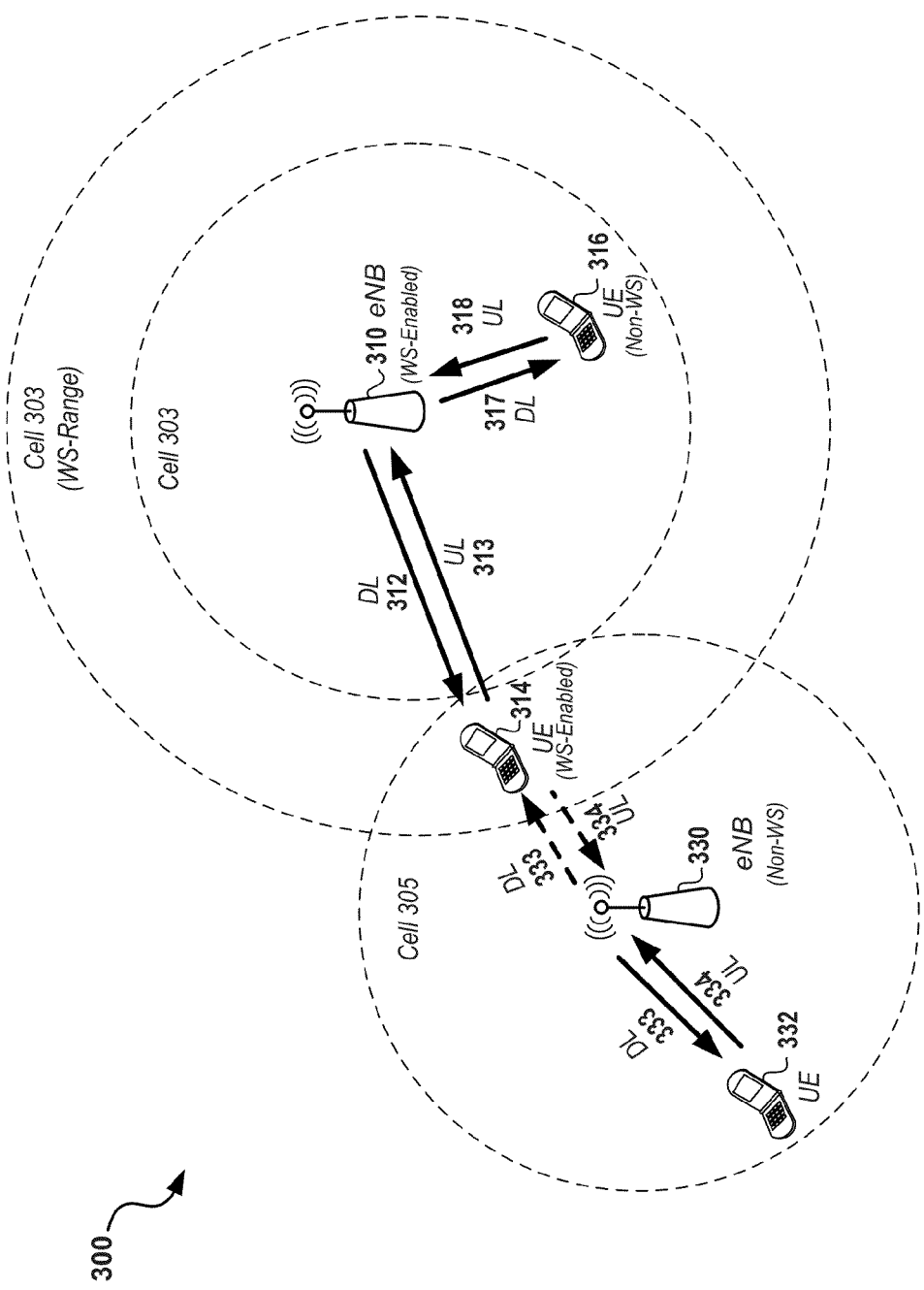
FIG. 3 illustrates a cognitive radio system using white space (WS).

Attention is now directed to FIG. 3, which illustrates an example of a cognitive LTE system 300 configured to utilize WS, such as in the UHF television spectrum. A first cell 303 is configured to utilize WS on one or both of the DL and UL. In one implementation, licensed spectrum is used for the UL, while WS may be used for the DL for certain communications. For example, a WS-enabled eNB 310 may be in communication with a first UE 316 as well as a second UE 314. UE 316 may be a non-WS enabled UE, whereas UE 314 may be WS-enabled. (as used herein, WS-enabled refers to a network device configured to utilize WS, typically in addition to licensed spectrum). In the example, DL 317 and UL 318, between eNB 310 and UE 316, are configured to use licensed spectrum, whereas DL 312, between eNB 310 and UE 314, may be configured to use WS, while UL 313 may be configured to use licensed spectrum.

Another cell 305 may be adjacent to cell 303 and may be configured with an eNB 330 to communicate with UE 332 using licensed spectrum for DL 333 and UL 334. In some situations, UE 314 may be within range of eNB 330 and as such may be subject to attempts by UE 314 to access eNB 330.

As noted previously, use of WS by devices in cognitive networks requires sensing of channel conditions. In systems such as LTE systems configured to operate in TV band WS, FCC requirements mandate monitoring the spectrum being utilized by a secondary device (i.e., a non-licensed user) for primary uses and vacation of the channel if a primary user is detected. Typical primary uses may be UHF television channels, wireless microphones, or other legacy devices.

In addition, coordination with other secondary users may be desirable to facilitate frequency sharing. FCC requirements mandate checking the channel for 30 second before switching to a new channel, monitoring channels at least every 60 seconds for primary users, and vacating the channel within 2 second when a primary user is detected. During checking, a quiet period is required in which no signal transmission of any network device is done. For example, in an LTE network having an eNB and three associated UEs, all four of these devices must refrain from transmitting during the quiet period so that other users may be detected.

Figure 4:
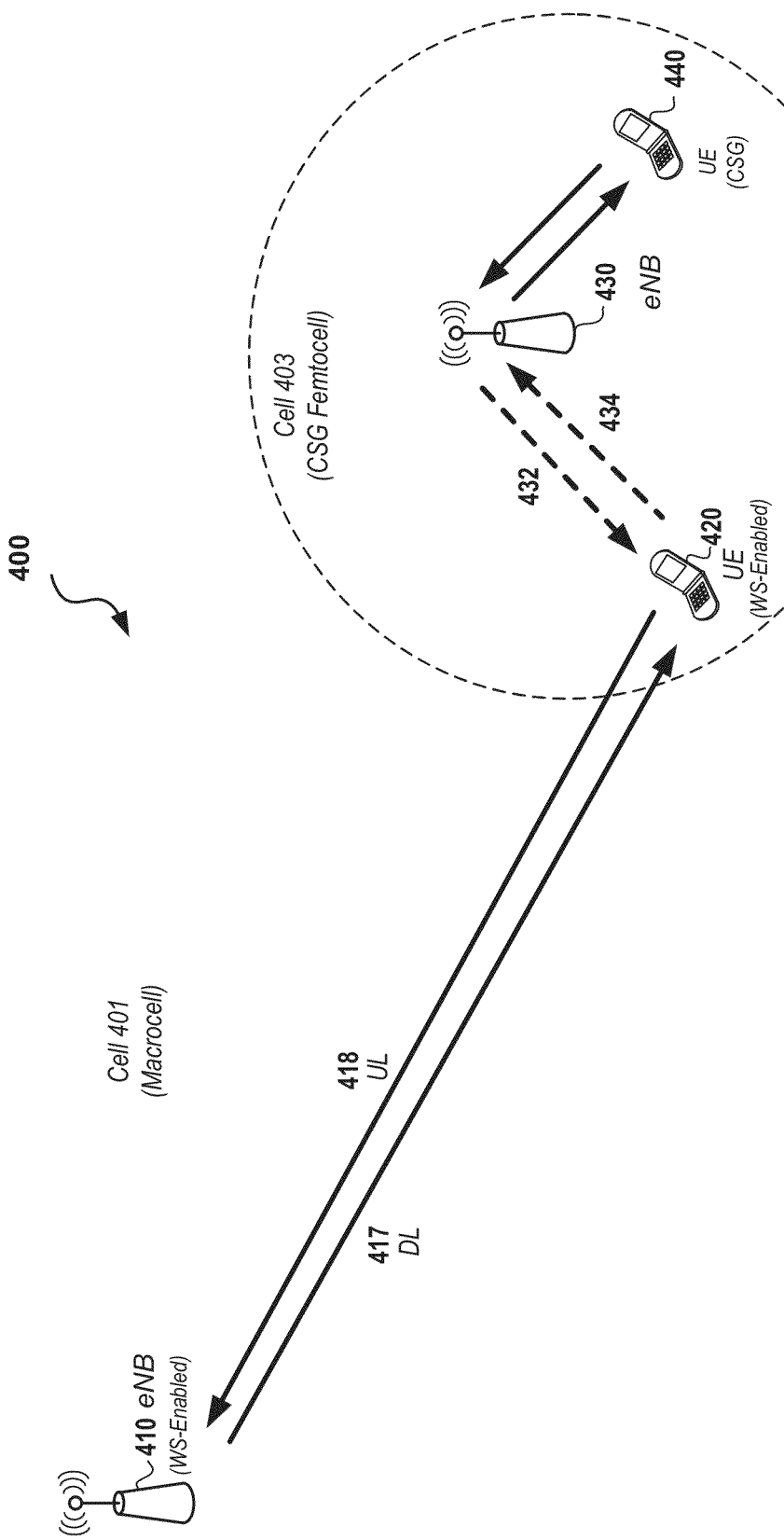
FIG. 4 illustrates an implementation of a cognitive Long Term Evolution (LTE) system with a closed subscriber group (CSG) femtocell.

FIG. 4 illustrates an example cognitive LTE system 400 including cell 401, which may be a macrocell, having associated eNB 410, which may be WS-enabled. In some implementations, cell 401 may be a femtocell or picocell, however, for purposes of illustration, FIG. 4 is described based on the assumption that cell 401 is a macrocell having a range including at least the distance to UE 420 as shown. UE 420 may be a WS-enabled UE, which may be capable of communicating as a legacy UE and/or as a WS-UE. An additional cell 403 may be in proximity to UE 420. eNB 430, which may be a femtonode, may be associated with cell 403, and may be in communication with one or more additional UEs (UE 440, and other UEs not shown). UE 420 may be in close proximity to eNB 430 and/or may receive a stronger signal from eNB 430 than from eNB 410. In general, UE 420 may seek to connect with eNB 430; however, eNB 430 may be part of a closed subscriber group (CSG) or may otherwise allow only restricted access. Consequently, UE 420 may establish a connection with eNB 410, such as via DL 417 and UL 418, as shown. Interference 432 may be generated by eNB 430 and may constrain operation of UE 420, particularly if the transmit signal levels from eNB 410 are weak relative to those from eNB 430. Additional UL interference 434 may be generated by UE 420, which may interfere with operation of cell

403. Consequently, it may be desirable for UE 420 to communicate with eNB 410 primarily on one or more WS channels (not shown), rather than on licensed channels. This may be done by limiting the signaling provided on licensed channels, such as to limit signaling to synchronization and/or broadcast information. In particular, this may be important on a licensed DL such as DL 417 shown in FIG. 4. In addition to this scenario, other network configurations may also make it desirable to limit communications between eNBs and UEs on licensed channels.

In order to address these problems, as well as others, operation between WS-enabled eNBs and UEs may be performed such that some or most of the traffic, particularly on the DL, is done using WS channels. In some implementations, only synchronization and control data and information may be provided on a licensed DL channel, while other data and information may be provided on one or more WS channels. In some implementations, modifications may be made to accommodate both WS-enabled and legacy (i.e., non-WS), UEs when connecting to a WS-enabled eNB. In cases using only WS-enabled UEs, use of licensed spectrum may be completely eliminated; however, in order to support legacy UE functionality, some licensed channel functionality is generally needed.

Figure 5:
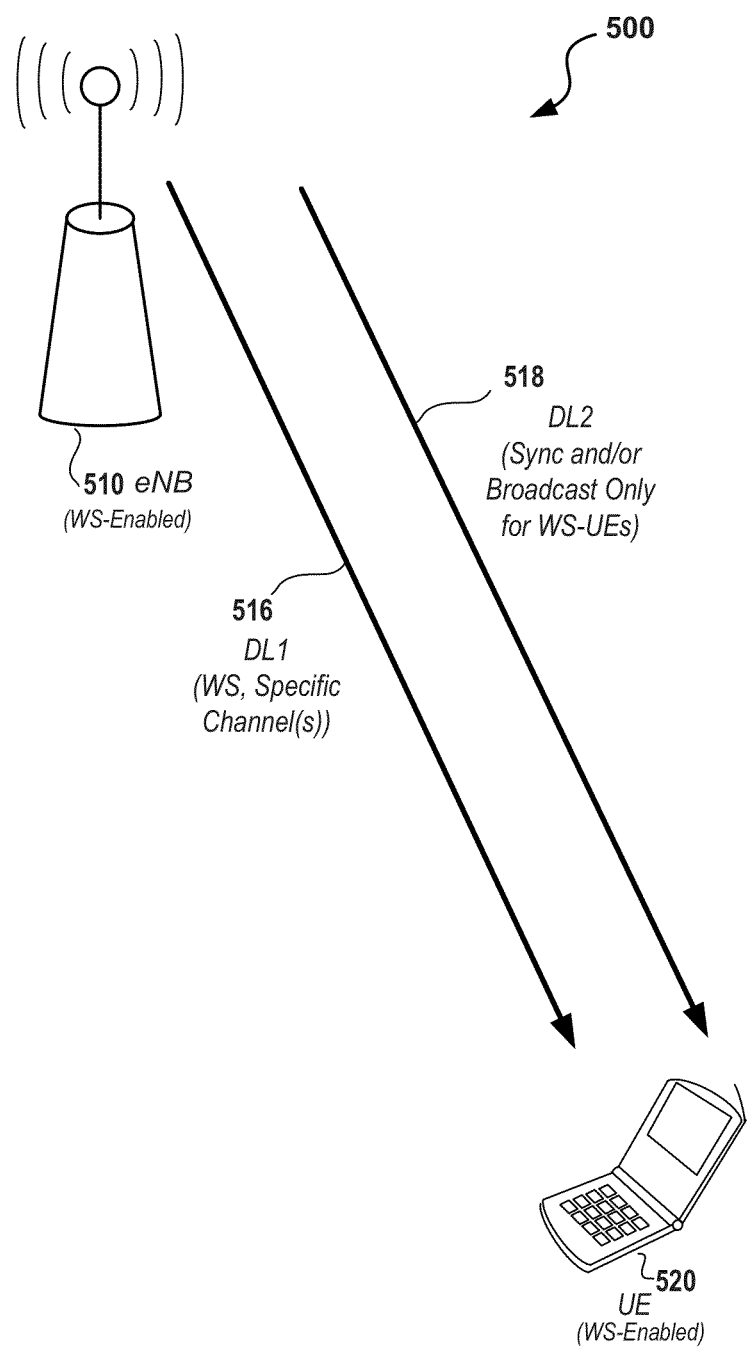
FIG. 5 illustrates details of an embodiment of signaling using a WS and a licensed channel.

Attention is now directed to FIG. 5, which illustrates a cognitive LTE system 500 including an eNB 510, which may be WS-enabled, and a UE 520, which may also be WS-enabled. Other cell nodes, as well as adjacent cells and their nodes (not shown) may also be present. Network 500 may be a heterogeneous network deployment, supporting different cells and nodes. These cells and nodes may be macrocells and corresponding nodes (which may be, for example, conventional base stations that use dedicated backhaul and are open to public access, with typical transmit power of approximately 43 dBm and antenna gain of 12-15 dBi), picocells and corresponding nodes (e.g., low power base stations that use dedicated backhaul connections and are open to public access, with typical transmit power of approximately 23-30 dBm and antenna gain of 0-5 dBi), femtocells and corresponding nodes (e.g., consumer deployable base stations that use a consumer's broadband connection for backhaul and may have restricted access, with typical transmit power less than 23 dBm) and/or relays (e.g. base stations using the same spectrum as backhaul and access, having power levels similar to picocells).

In accordance with one aspect associated with WS transmission, eNB 510 may be configured so as to provide multiple DL transmissions to UE 520. As shown in FIG. 5, these may include one or more WS DL channels, including DL1 516, as well as one or more licensed DL channels DL2. DL1 may be used for most of the DL transmissions between eNB 510 and UE 520, with DL2 reserved for only certain functions. These functions may be, for example, synchronization and broadcast functions, which may be provided in a standard format for legacy UEs. Alternately, or in addition, synchronization and broadcast signaling may also include specific signaling for WS-UEs to facilitate operation on one or more WS channels.

In LTE, system information on the transport side is logically mapped to the broadcast channel (BCH), broadcast control channel (BCCH), or DL shared channel (SL-SCH). Different physical channels may be used.

In operation, a UE entering a cell will first synchronize (using, for example, PSS and SSS) with the cell's eNB, and then once synchronized receive broadcast information about the cell configuration (using, for example, the MIB and SIBs). In LTE a master information block (MIB) and system information blocks (SIBs) are used as part of radio resource control (RRC). The MIB includes a limited amount of information comprising the most frequently transmitted parameters which are essential to a UEs initial access to the network. SIB1 contains parameters needed to determine if a cell is suitable for cell selection, as well as information about the time-domain scheduling of the other eNBs. SIB2 includes common and shared channel information. SIBS3-8 include parameters used to control infra-frequency, inter-frequency, and inter-RAT (Radio Access Technology) cell reselection. Additional information may also be added to SIB, including information as described further herein, in various embodiments.

Once the UE has achieved synchronization, it will read the MIB to camp on the cell. Since the MIB contains very little information (i.e., information about the cell bandwidth, some information about the physical HARQ indicator channel (PHICH), and the system frame number (SFN)).

The SIBs may be transmitted on DL-SCH mapped on PDSCH. To receive information about SIB's the UE needs information about PHICH, which is read from the MIB. The BCH channel has a TTI of 40 ms, and has a very small transport block size, while being protected with ⅓ convolutional code and 16 bit CRC. This helps to keep the overhead in an LTE system to a minimum.

Figure 6:
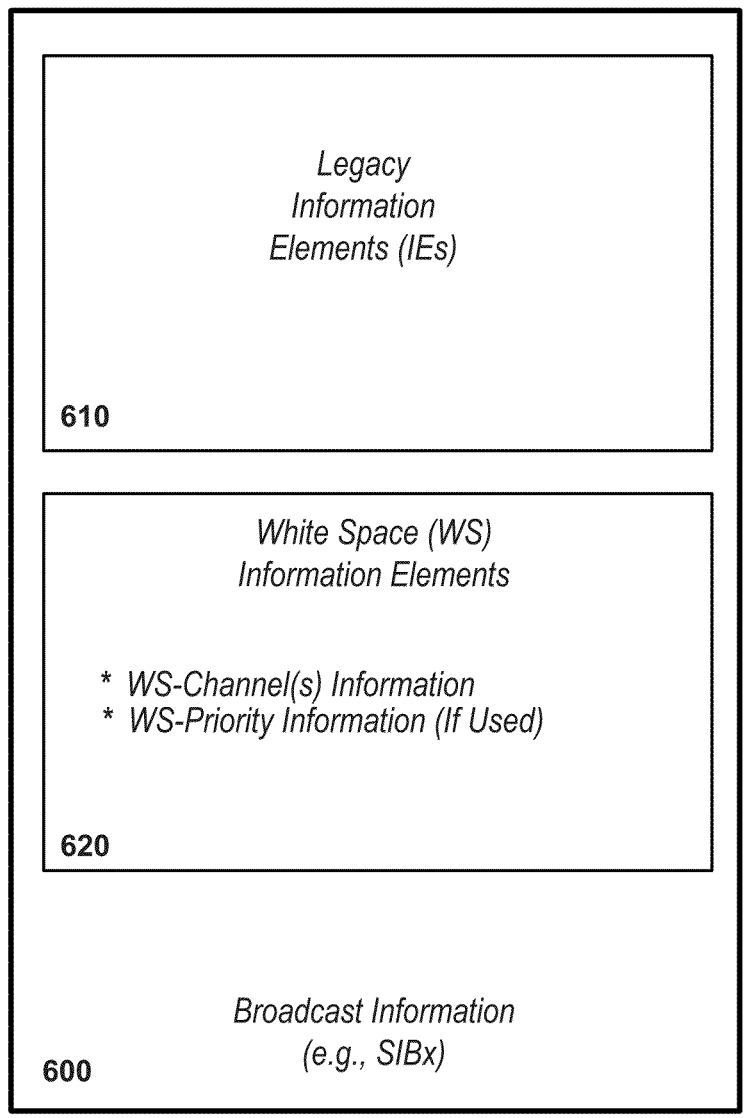
FIG. 6 illustrates an embodiment of a SIB for use in cognitive LTE.

In order to facilitate WS operation, in one implementation, alternate SIB configurations may be used. FIG. 6 illustrates one embodiment 600 of such a SIB configuration, where legacy SIB information 610, such as, for example, was described above, may be combined with WS-specific information elements (IEs) 620. These WS IEs may include information such as WS channel or channels information or data, WS channel priority information or data, or other WS-specific data or information. The WS-specific information may be incorporated in various SIBs, however, it may be desirable to include the information in the most frequently sent SIBs. For example, SIBs 1 and 2 may be preferable. In some implementations, additional control information related to cognitive operation may be provided. For example, control information related to quiet periods (i.e., used by UEs or other network nodes for sensing as described previously), cognitive capabilities at the eNB side, such as, for example, band support, support for distributed sensing processes wherein sensing is performed at multiple network nodes and combined. Other information related to control and cognitive processing may also be provided in various implementations.

Figure 7:
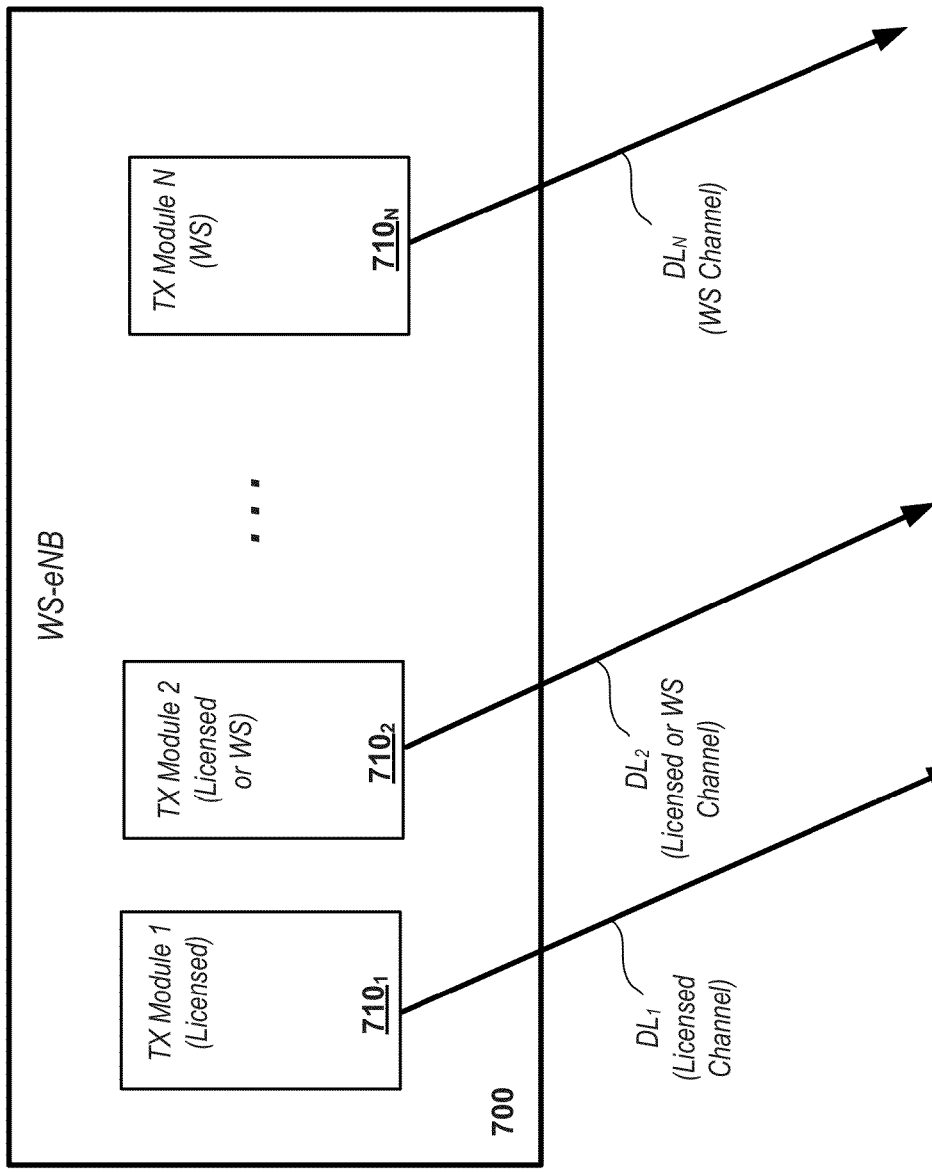
FIG. 7 illustrates an eNB configuration using multiple downlink (DL) channels.

Attention is now directed to FIG. 7, which illustrates a WS-enabled eNB having multiple DL transmitters 2801 thru 280N. Each of transmitters 280 may be configured to operate on a selected WS or licensed channel. At a minimum, two channels may be provided, with one being configured to use licensed spectrum and the second being configured for WS spectrum.

In many implementations, it is expected that a UE will need to search many potentially available WS channels during initial cell acquisition. This may create considerable limitations in acquisition since the UE would need to search PSS, SSS, PBCH, or other channel for each WS channel, which may take significant time.

Consequently, rather than performing a blind search on a potentially large number of WS channels, it may be desirable for the UE to perform initial acquisition using a licensed channel, and then transfer some or all operation to one or more WS channels. This approach may speed up connection time and/or reduce overhead and/or UE power consumption.

Figure 8:
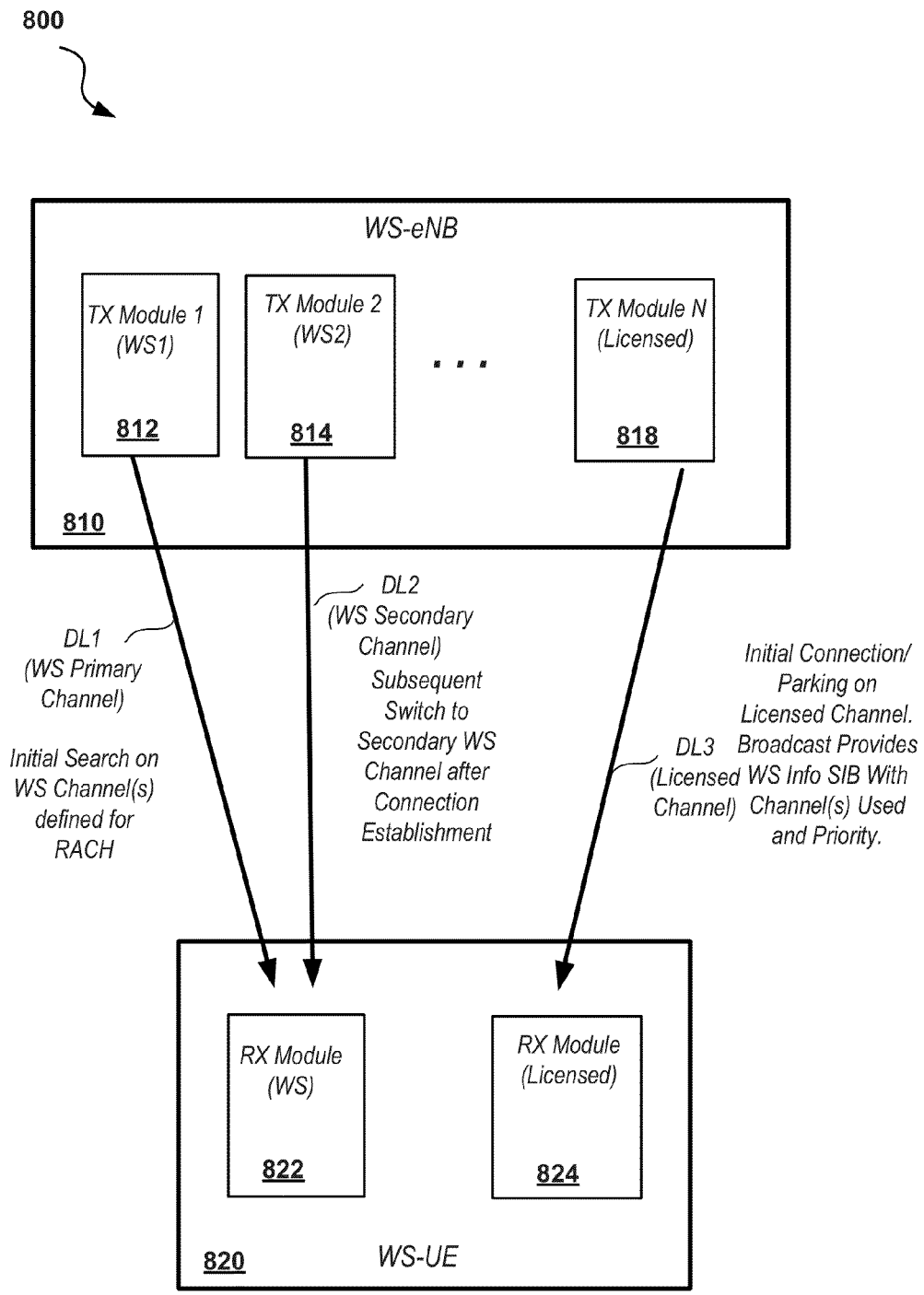
FIG. 8 illustrates a DL channelization for one embodiment of licensed to WS DL transition.

Attention is now directed to FIG. 8, which illustrates one embodiment of a WS-enabled system 800 on which such as process may be implemented. System 800 includes WS-enabled eNB 810 and UE 820, and may include other nodes (not shown). eNB 810 may be configured to operate on one or more WS channels with corresponding WS transmitters 812 and 814 (it is noted that in some implementations a single WS transmitter 812 may also be used). In addition, eNB 810 is configured to operate on at least one licensed channel using transmitter 818.

Likewise, UE 820 may be configured with a WS receiver module 822 and a Licensed receiver module 824. In some implementations, other receiver modules (not shown) may also be used. Alternately or in addition, in some implementations receiver functionality associated with 2 or more modules may be incorporated into a single receiver module.

In operation, UE 820 initially connects to eNB 810 by receiving signals on DL3 (on the licensed channel). This information may be limited to synchronization and/or broadcast information, such as described previously herein. Upon acquisition, UE 820 may then receive information on one or more SIBs to facilitate transition to one or more WS channels. This information may be provided in an IE in SIBs 1 or 2, for example. These WS channels may then be searched and acquired without the need to perform extensive WS channel searching. In some cases, a single WS channel (such as, for example, is provided via DL1 of FIG. 8). Alternately, in some implementations, multiple WS channels may be used. A second WS channel may be provided via DL2 as shown in FIG. 8). Additional WS channels (not shown) may also be provided.

In some implementations using multiple WS channels, the SIB information provided on the licensed channel may also include information associated with WS channel prioritization. For example, where multiple WS channels are used, they may be prioritized by the eNB scheduler and/or the associated core network. This may be based on channel characteristics, loading, or other factors such as, for example presence of primary users. Based on the priority, a UE may then select an appropriate WS channel and transfer operation to that channel. As noted previously, WS operation will generally be used primarily for the DL, however, in some implementations WS channels may also be used for UL transmission.

In the example configuration of FIG. 8, the WS channels may be further organized by functionality. For example, one WS channel may be configured for initial access, such as to perform random access channel (RACH) procedures, and then once a connection is established, the eNB may transfer operation to another WS channel. In this implementation, the RACH procedure signaling may be provided on only one or a few of the WS channels used.

Figure 9:
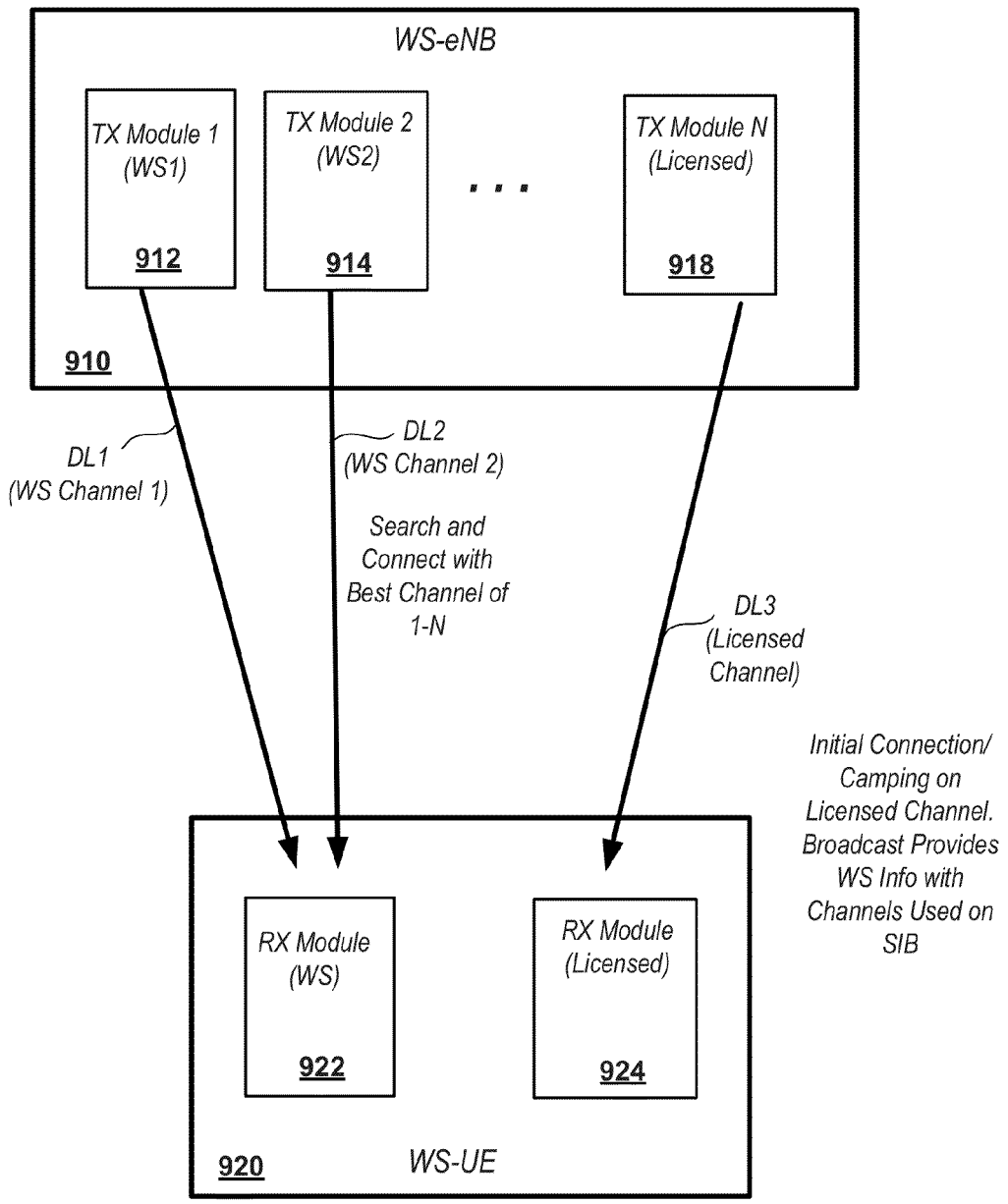
FIG. 9 illustrates a DL channelization for one embodiment of licensed to WS DL transition.
Figure 10:
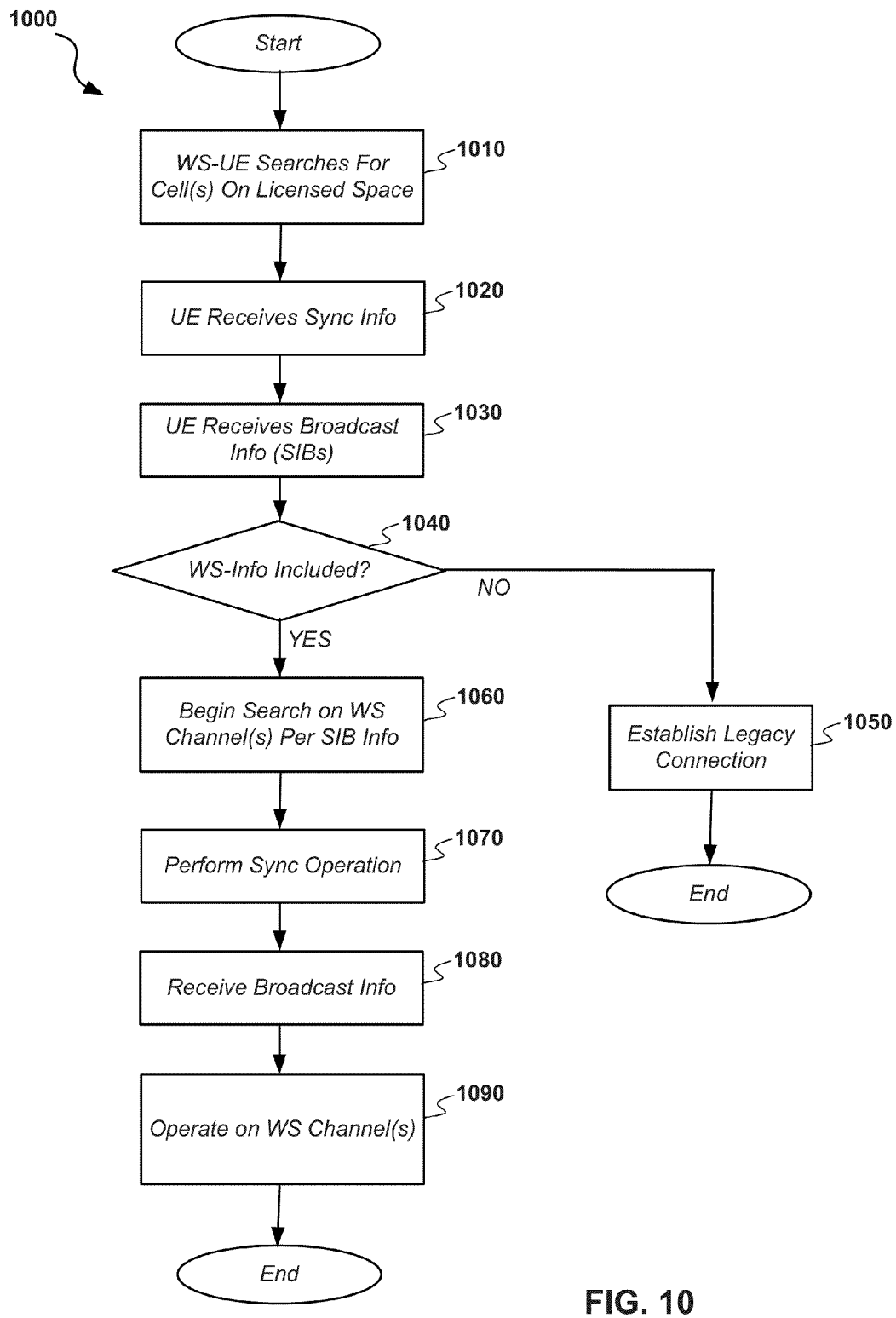
FIG. 10 illustrates an embodiment of a process for UE connection to an eNB.

FIG. 9 illustrates another configuration 900, where multiple WS transmitters are used by an eNB 910, similar to that shown in FIG. 10. In this implementation, however, the licensed channel provides only information regarding which WS channel or channels are being used. This information may be provided in an IE in SIBs 1 or 2, for example. Upon receipt of this information, a UE 920 may then transition operation to one or more of the available WS channels. In this case, the eNB will generally provide RACH procedure capability on multiple WS channels to allow connection with any of the channels, rather than a preferred or required channel as shown in FIG. 8.

In some cases, the UE 920 may have previously searched the available WS channels and may have determined one or more preferable channels. Alternately or in addition, the UE may have detected an unusable channel, such as, for example, a channel that is being used by a primary user (and it therefore restricted). If the UE has not done any previous searching, it may proceed to acquisition of a particular WS channel or, in some cases, multiple WS channels if supported by the UE.

Once UE operation has been established, the UE may signal information to the eNB regarding which channel or channels it has selected, and/or other information related to WS operation.

Attention is now directed to FIG. 10, which illustrates an embodiment of a process 1000 for connection and WS operation. At stage 1010, a WS-enable UE, such as the UEs shown in FIGS. 1-5 and 8-9, search for cells on licensed spectrum. The initial search process may be done only on licensed spectrum, even if the UE is capable of performing similar searching on WS channels. At stage 1020, the UE may receive synchronization signals (e.g., PSS, SSS) and perform synchronization operations such as are described in, for example, the LTE specifications. Once synchronized with a particular cell and associated eNB, the UE may then receive broadcast information, which may be provided in one or more SIBs such as described previously herein. The associated eNB may be WS enabled or may be a legacy eNB (i.e., not WS enabled). At decision stage 1040, a decision may be made based on the SIB information element(s). If no WS information is received, the UE may proceed to stage 1050 where a legacy connection may be established. Alternately, if WS-specific information (such as, for example, WS channelization and/or priorities) is received, the UE may proceed to stage 1060, where a search of WS channel or channels may be done. The channel search may be based on WS channel information provided in the SIB or SIBs received from the licensed channel. At stage 1026, a synchronization operation may be performed based on signaling (e.g., PSS, SSS) received on a detected WS channel or channels. At stage 1080, broadcast information (such as, for example, MIB, SIB 1, or SIB2) may be received via a WS channel. Finally, at stage 1090, the UE may begin operation on the WS channel. In particular, the UE may begin to receive DL transmissions on the WS channel, and in some cases may also use a WS UL channel to communicate with the eNB.

In some implementations, WS-enabled eNBs may be in communication only with legacy UEs (i.e., no WS-enabled UEs are present). In this case, licensed channel signaling as described previously herein may also be used, with the additional requirement that the eNB support data traffic on the licensed DL channel, in addition to the control information described previously (e.g., synchronization and broadcast information). In addition, in some implementations legacy UEs (as well as WS-UEs) may be operated in a network, such as a heterogeneous network (hetnet), which further includes resource partitioning functionality. In some implementations, the resource partitioning functionality may be triggered only upon addition of a legacy UE. For example, if there is any interference coordination scheme (i.e., resource partitioning and interference coordination techniques), the hetnet may be configured based solely on legacy users and not WS users (unless the WS users are also impacting the licensed spectrum traffic).

Figure 11:
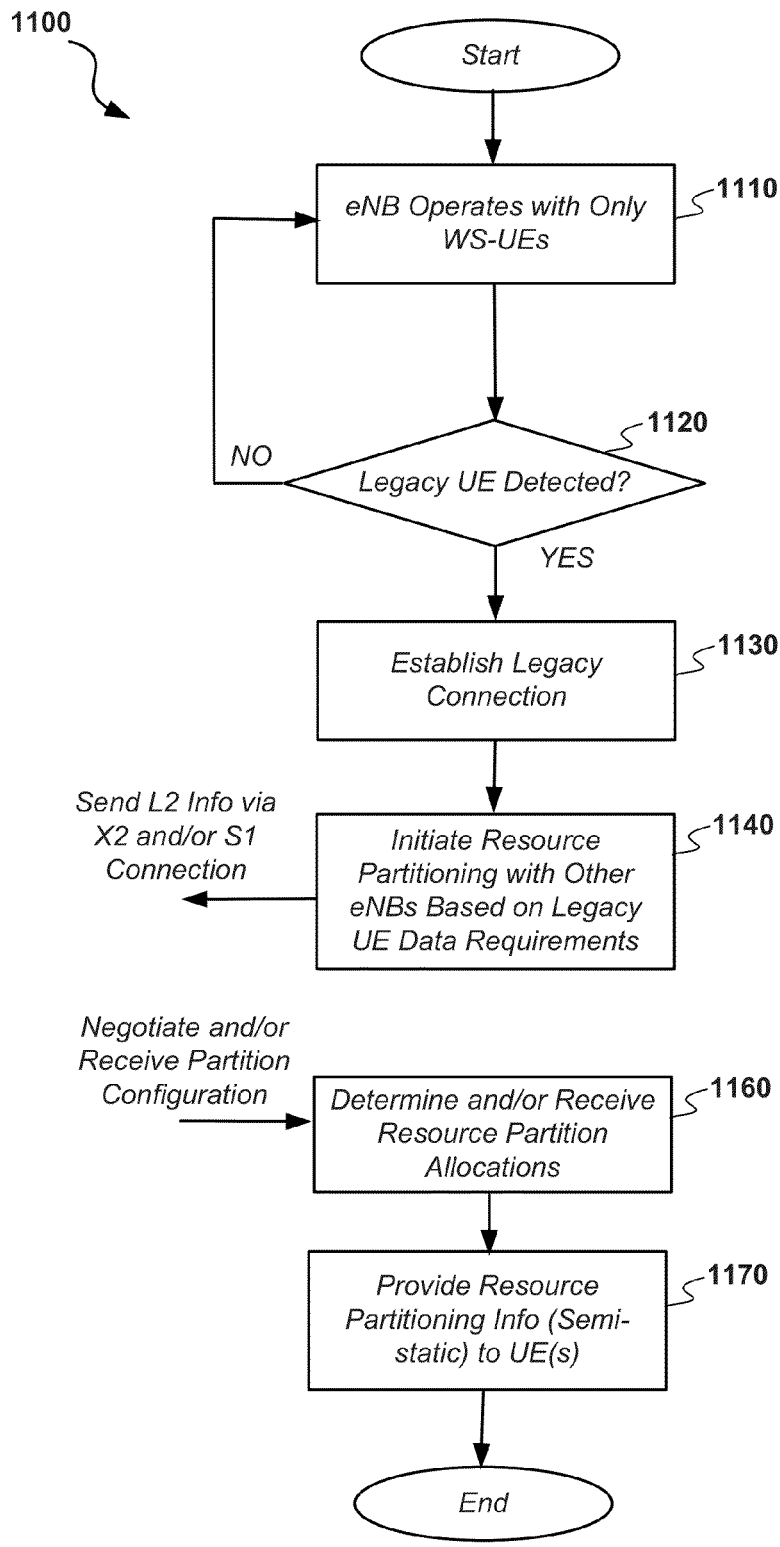
FIG. 11 illustrates an embodiment of a process for interference coordination in a cognitive LTE network.

An example of this is shown in FIG. 11, which illustrates a process 1100 for transitioning operation of an eNB from WS-only operation. Similar procedures may be used for addition of legacy UEs to a network already including one or more legacy UEs. At stage 1110, it is assumed that an eNB is operating only with WS-UEs and may not be using any interference coordination. At stage 1120, a new UE may be added, and a decision as to whether the new UE is a legacy UE or WS-UE may be made. If the new UE is a WS-UE, processing may continue to stage 1110. Alternately, if a legacy UE is detected, the eNB may then establish a legacy connection at stage 1130, such as solely through use of licensed channels. At stage 1140, the eNB may then initiate interference coordination with other adjacent eNBs, which may be done using L2 signaling. This may be done by using, for example, X2 and/or S1 connections with the adjacent eNBs which may include information such as, for example, loading. Coordination may be determined by the eNB, by another eNB, in coordination between eNBs, and/or by a core network module. At stage 1160, the eNB may receive partition configuration information and/or resource allocations. The partition information may be signaled to the legacy UE or UEs (such as, for example, semi-static allocations), and/or to the WS-UEs.

In addition, at stage 1140, L2 signaling may include signaling information associated with both the legacy UE(s) using licensed spectrum, as well as WS-UEs. This may be useful, for example, if adjacent cells use the same WS, coordination of WS spectrum use may also be done. Moreover, in some cases, coordination of use of both licensed and WS spectrum may be done between two or more adjacent eNBs, which may be of different classes and/or power levels.

Figure 12:
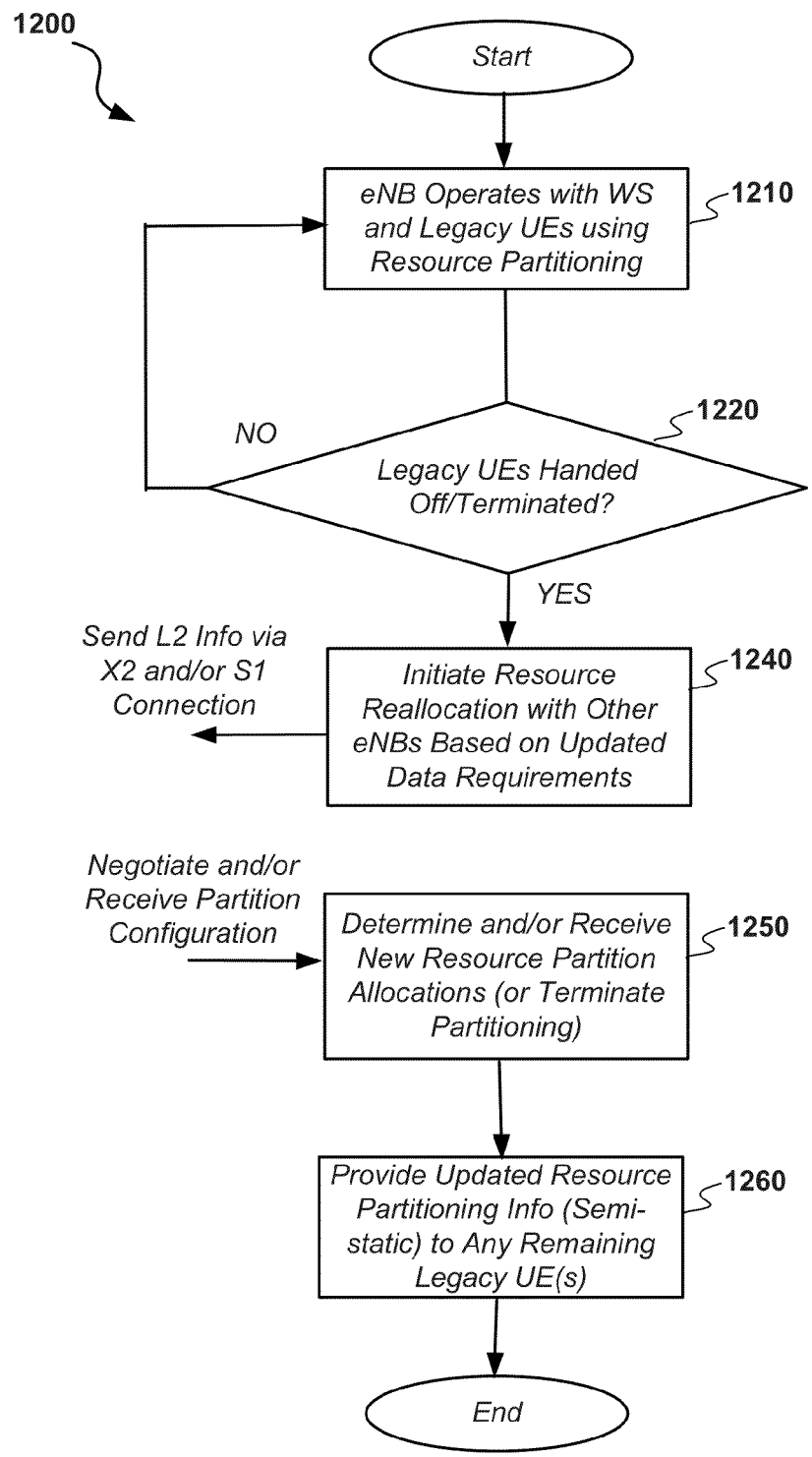
FIG. 12 illustrates an embodiment of a process for interference coordination in a cognitive LTE network.

Attention is now directed to FIG. 12, which illustrates an embodiment of a corresponding process 1200 for reallocating resources upon termination of a legacy UE connection in a WS-enabled cell. At stage 1210 it is assumed that a WS-enabled eNB in operating with both WS and legacy UEs, and interference coordination is being used, such as by use of resource partitioning. At stage 1220, a decision step may be performed to test for disconnection of a legacy UE (such as by power off, handoff, or other event). If a legacy UE has terminated operation, a resource reallocation request may be made at stage 1240. This may include sending L2 information, such as via an X2 or S1 connection, to adjacent eNBs. A resource reallocation may be negotiated or determined, and may be received at the eNB at stage 1250. If no legacy UEs remain, the eNB may wish to terminate resource partitioning. At stage 1260, updated resource partitioning information (such as, for example, semi-static subframe allocations) may be provided to any remaining legacy UEs. In addition, the information may also be provided to any WS-UEs.

Figure 13:
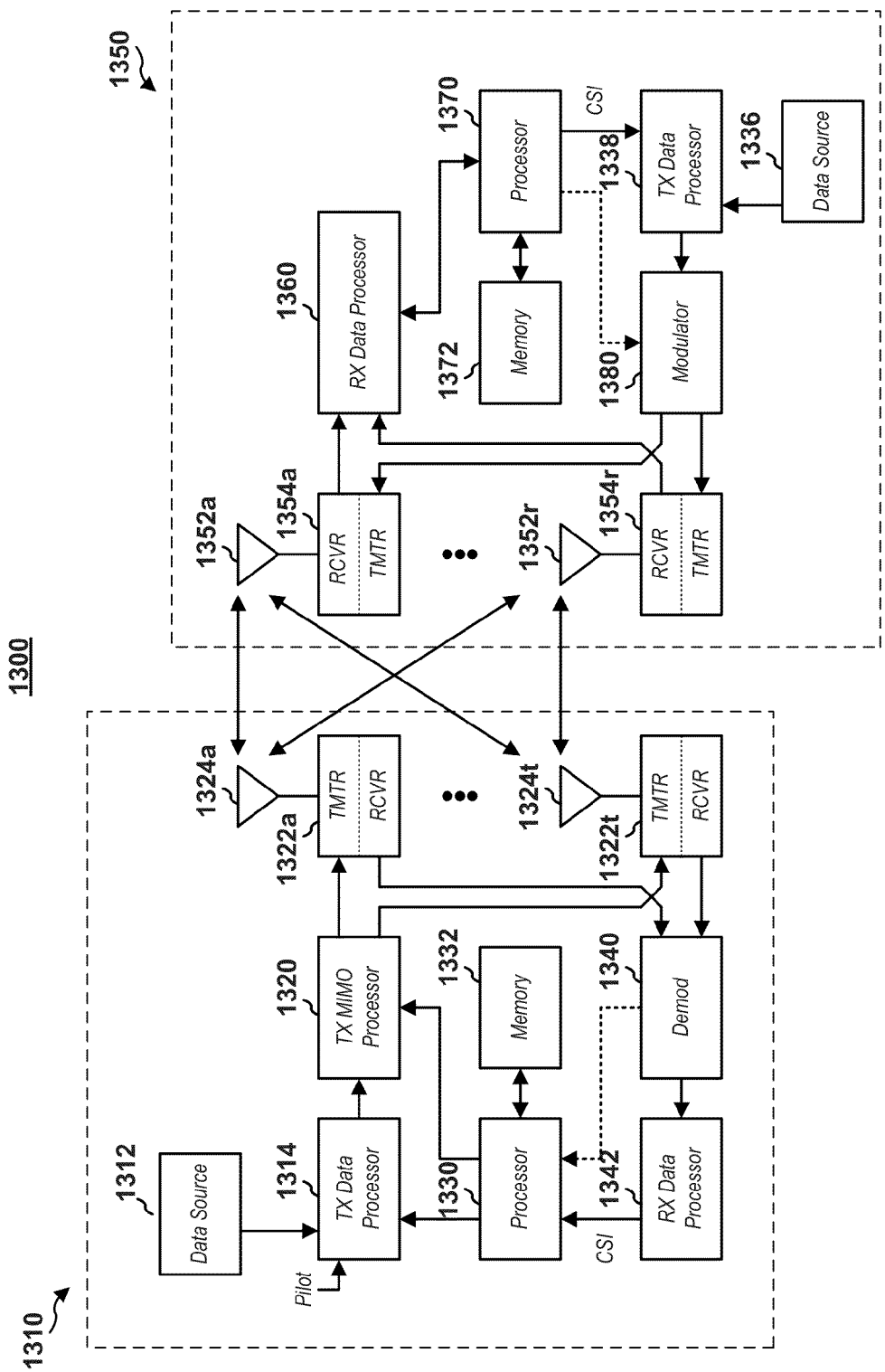
FIG. 13 illustrates details an embodiment of a cognitive network including a UE and eNB which may be WS-enabled.

Attention is now directed to FIG. 13, which illustrates a system 1300 including a transmitter system 1310 (also known as the access point or eNB) and a receiver system 1350 (also known as access terminal or UE) in an LTE MIMO system 1300. At the transmitter system 1310, traffic data for a number of data streams is provided from a data source 1312 to a transmit (TX) data processor 1314. Each data stream is transmitted over a respective transmit antenna. TX data processor 1314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1330.

The modulation symbols for all data streams are then provided to a TX MIMO processor 1320, which may further process the modulation symbols (e.g., for OFDM). TX MIMO processor 1320 then provides NT modulation symbol streams to NT transmitters (TMTR) 1322a through 1322t. In certain embodiments, TX MIMO processor 1320 applies beam-forming weights to the symbols of the data streams and to the antenna from which the symbol is being transmitted.

Each transmitter 1322 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1322a through 1322t are then transmitted from NT antennas 1324a through 1324t, respectively.

At receiver system 1350, the transmitted modulated signals are received by NR antennas 1352a through 1352r and the received signal from each antenna 1352 is provided to a respective receiver (RCVR) 1354a through 1354r. Each receiver 1354 conditions (e.g., filters, amplifies, and down-converts) a respective received signal, digitizes the conditioned signal to provide samples, and further processes the samples to provide a corresponding "received" symbol stream.

An RX data processor 1360 then receives and processes the NR received symbol streams from NR receivers 1354 based on a particular receiver processing technique to provide NT "detected" symbol streams. The RX data processor 1360 then demodulates, de-interleaves, and decodes each detected symbol stream to recover the traffic data for the data stream. The processing by RX data processor 1360 is complementary to that performed by TX MIMO processor 1320 and TX data processor 1314 at transmitter system 1310.

A processor 1326 periodically determines which pre-coding matrix to use (discussed below). Processor 1326 formulates a reverse link message comprising a matrix index portion and a rank value portion. The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by transmitters 1354a through 1354r, and transmitted back to transmitter system 1310.

At transmitter system 1310, the modulated signals from receiver system 1350 are received by antennas 1324, conditioned by receivers 1322, demodulated by a demodulator 1340, and processed by a RX data processor 1342 to extract the reserve link message transmitted by the receiver system 1350. Processor 1330 then determines which pre-coding matrix to use for determining the beam-forming weights then processes the extracted message.

DETERMINATION AND BROADCAST OF WHITE SPACE (WS) CHANNEL INFORMATION: In some communication systems using licensed channels as well as unlicensed channels, such as WS channels, it may be desirable to provide information regarding WS channel utilization between base station nodes, such as eNBs, as well as from base stations to user terminals, such as UEs.

For example, in some implementations, a wireless network, such as an LTE network, may include a macrocell controlled by a macronode base station, such as a macro eNB. One or more additional nodes, such as, for example, low power nodes, may also be partially or fully within the coverage area of the macronode (e.g., within a coverage umbrella of the macrocell). The low power nodes may be, for example, low power base stations or eNBs, such as femtocell nodes (femtonodes), picocell nodes (piconodes), and/or other lower power nodes. In addition, in some cases, the other nodes may also be macrocell nodes of the same or different power levels. For example, macronodes of various power classes may be deployed within overlapping coverage areas of a primary macronode. Although the various embodiments described below are described with respect to a macrocell node (e.g., macro base station or eNB) and one or more low power nodes (e.g., pico or femto base station or eNB), the techniques and apparatus may also be used in configurations with macrocells of different types and/or power levels. In a typical implementation, the macrocell base station may be an eNB configured such as is shown in, for example, FIG. 13.

In some embodiments, the macrocell node may be configured to transmit and receive signals from connected or served user terminals, such as UEs, only on licensed spectrum. However, in cognitive systems, the macro and/or additional low power nodes may be further configured to operate on both licensed spectrum and unlicensed spectrum, such as WS spectrum and associated WS channels. In a typical implementation, the licensed spectrum may be spectrum licensed for LTE operation, while the unlicensed spectrum may be WS spectrum, such as TV WS spectrum as described previously herein. In one example implementation, approximately 40 WS channels may be available within the WS spectrum. It will, however, be apparent that other spectrum and channel configurations may be used in some implementations.

In implementations such as LTE systems, several basic broadcast signals including cell-related information are periodically transmitted by a base station of each cell to allow user terminals, such as UEs, to locate or discover the cell, measure cell signal characteristics and determine cell information, such as cell identification (cell ID), and possibly access or camp on the cell.

WHITE SPACE (WS) PROCEDURES FOR LTE: In accordance with aspects of the embodiments described herein, there is provided a WS technique for LTE operation of a mobile entity (e.g., a UE, access terminal, or the like) by storing the WS credentials as part of the UE subscription information.

In order to operate in WS, a network entity (e.g., an eNB or the like) and the mobile entity should perform certain procedures in order to authorize operation in the WS spectrum based on local regulations. The network entity may perform the WS operation procedures before it starts advertising service availability in the WS spectrum. The mobile entity may perform the WS operation procedures in order to start using the WS spectrum for communication.

The technique described herein simplifies the authorization procedures by storing the WS credentials of the mobile entity in the subscription information or the like for the mobile entity in the network, and by passing it around to other network entities as the mobile entity is handed over in the network.

It is noted that there may be two different types of devices operating in the WS spectrum. A first type of device, referred to herein as a UE eNodeB (UeNB) may be a device that advertises its availability as an eNB in a whitespace spectrum and may provide network connectivity for other UEs. A UeNB may have a wireless backhaul including LTE in licensed spectrum, or a wired backhaul. A second type of device, referred to herein as a terminal UE (TUE), may be a UE connecting to the network via the UeNB for service in a whitespace spectrum.

Figure 14A:
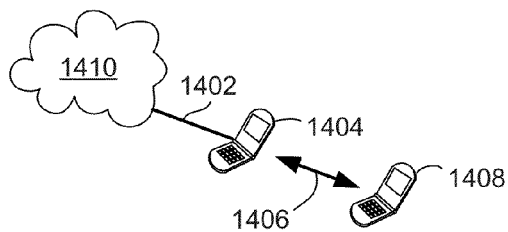
FIGS. 14A-B show embodiments of a UE eNodeB (UeNB) providing network connectivity to a terminal UE over a wired backhaul and an LTE backhaul.
Figure 14B:
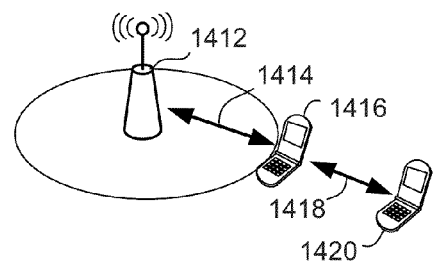

With reference to the example of FIG. 14A, there is shown a UeNB 1404 providing network access via a wireless link 1406 to a terminal UE 1408, wherein UeNB-1 has a wired backhaul 1402 to the network 1410. FIG. 14B shows a UeNB 1416 providing wireless access over link 1418 to a terminal UE 1420, wherein the UeNB 1416 is being served via wireless link 1414 by an eNB 1412 that uses an LTE backhaul or the like (not shown). In both of these examples, a given UeNB may provide network connectivity to a terminal UE over a wired backhaul and/or an LTE backhaul.

In related aspects, while a UeNB is active, it may: communicate with its (potentially) served terminal UEs on the access; and, for a relay, communicate with its serving eNB on the backhaul. On the backhaul-hop, the UeNB may behave essentially like a UE, from the PHY-MAC perspective. During periods of low traffic activity, the UeNB may go into discontinuous reception (DRX) or idle mode on the backhaul hop for power-saving or network-load-alleviation. On the access-hop, the UeNB may behave essentially like a cell, from the PHY-MAC perspective. The UeNB may incorporate additional power-savings techniques as compared to a regular eNB or network-relay.

Figure 15:
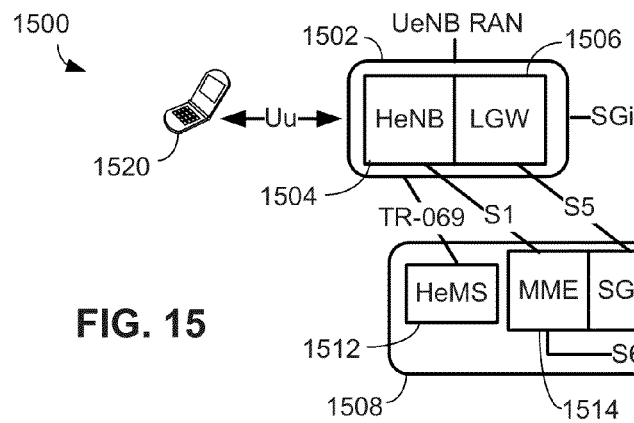
FIG. 15 shows an example architecture reference model for a UeNB.

ARCHITECTURE REFERENCE MODEL: With reference to FIG. 15, there is shown a general architecture reference model 1500 for a UeNB 1502 servicing a terminal 1520. The data plane terminates at the eNB function 1504 for the UeNB, thereby bypassing the UeNB Core Network (CN) 1508 control plane to provide access to a Wide Area Network 1510 (e.g., the Internet) via a local gateway (LGW) 1506. For example, the architecture defined for Local IP access (LIPA) or Selective IP Traffic Offload (SIPTO) in Rel-10, or variations thereof, may be employed. The Home enhanced Management System (HeMS) 1512 (Operations, Administration, & Maintenance (OAM)) may reuse TR-025 as defined for the Home enhanced Node B (HeNB) 1504, or variations thereof. The control plane may be centralized using the Mobility Management Entity (MME) 1514/Serving Gateway (SGW) 1516 and Home Subscriber Server (HSS) 1518, such that changes to existing protocols are not needed and the whitespace procedures may be supported upon implementation of the above described general architecture.

Figure 16:
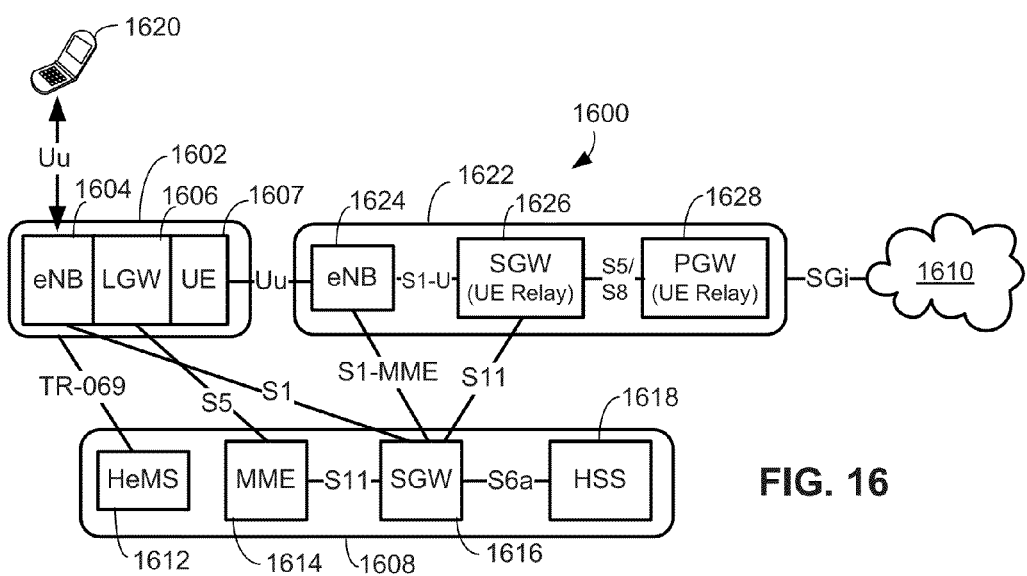
FIG. 16 shows an example architecture reference model for a UeNB acting as a relay.

With reference to FIG. 16, there is shown a general architecture reference model 1600 for a UeNB 1602 (including eNB 1604, LGW 1606 and UE 1607) with an LTE backhaul 1622 (i.e., a UeNB acting as a relay) including eNB 1624, SGW 1626 and PGW 1628. For the WS backhaul, a baseline UeNB 1622 provides the access to Wide Area Network 1610 for terminal 1620. For WS access, a baseline UeNB 1622 may provide any type of backhaul. Such a protocol may run over the top of various networks, for example, legacy cellular network, wired, or Wi-Fi. The UeNB/Donor eNB (DeNB) core network 1608 may include the HeMS node 1612, SGW 1516, MME 1614 and HSS 1618, similarly to model 1500.

Figure 17:
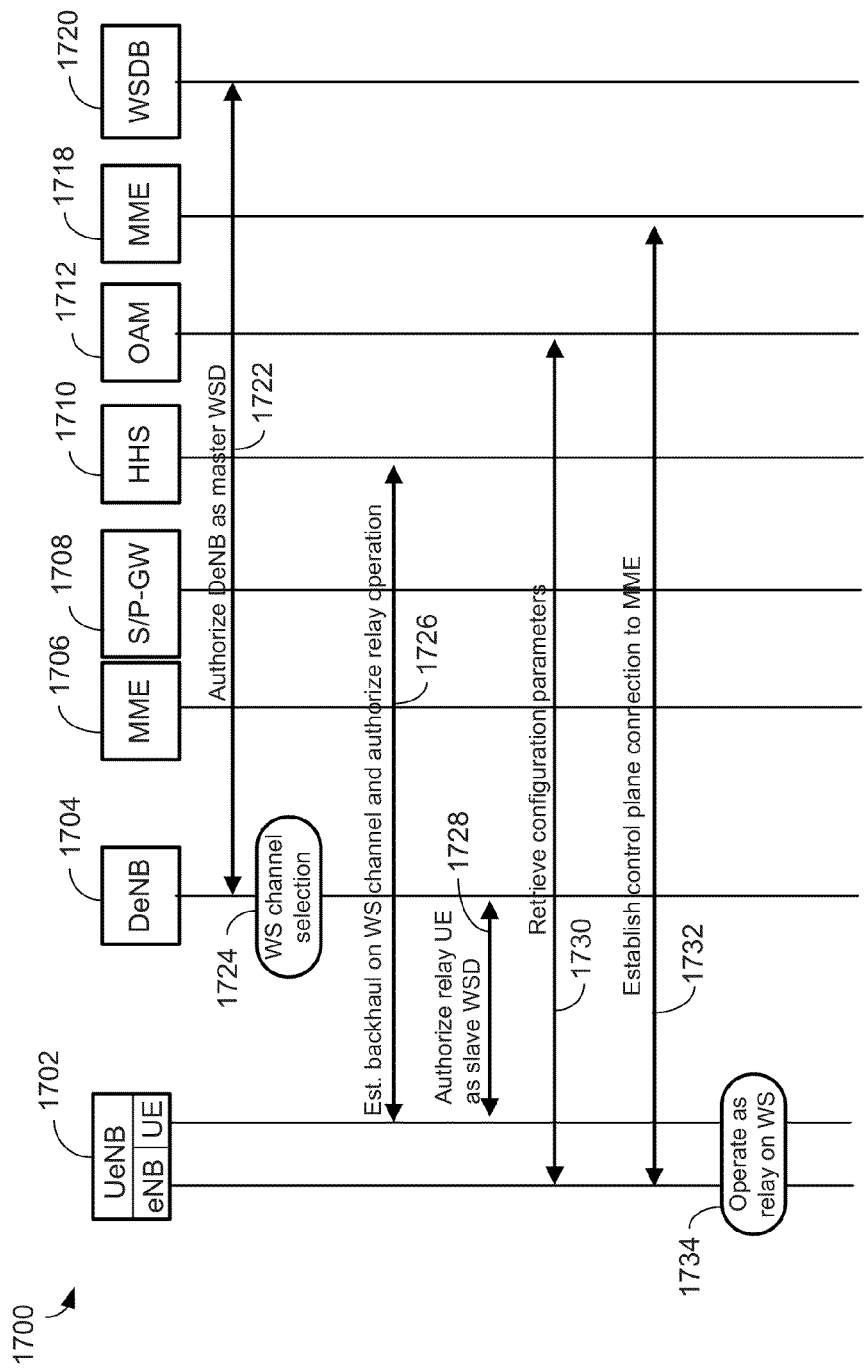
FIG. 17 illustrates an example call flow for UeNB setup for WS backhaul.

UeNB SETUP FOR WS BACKHAUL: With reference to FIG. 17, there is shown an example call flow 1700 for UeNB 1702 setup for the WS backhaul. Other entities in the call flow 1700 include the donor eNB 1704, MME 1706, SGW/PGW 1708, HHS 1710, OAM 1712, MME 1718 and WS database (WSDB) 1720. The setup may include WS procedures 1722, 1728 and channel selection 1724. Further aspects of the setup 1700 may include: authorization to establish a connection by the UeNB 1726 as defined in 3GPP for a UE in TS 23.401, for example, authorizing a relay operation or other service request; OAM configuration 1730 as defined in 3GPP for a eNB in TS 32.593; and CN control plane setup 1732 as defined in 3GPP for a eNB in TS 36.413. After establishing the control plane connection to the MME, the UeNB 1702 operates as a relay on WS bandwidth1734.

More specifically, with continued reference to FIG. 17, at 1722, the Donor eNB (DeNB) 1704 may be authorized as a master white space device (WSD) for use of the WS. At 1724, the DeNB may perform WS channel selection. At 1726, the UeNB may establish backhaul connectivity on the WS channel and authorization for operating as a relay UE. At 1728, the UeNB may be authorized as a slave WSD for use of the whitespace. At 1730, the UeNB may retrieve configuration parameters via the OAM. At 1732, the UeNB may establish a control plane connection to the MME using S1 and S5 setup procedures. The UeNB may then, at 1734, operate as a relay UE on WS bandwidth.

Figure 18:
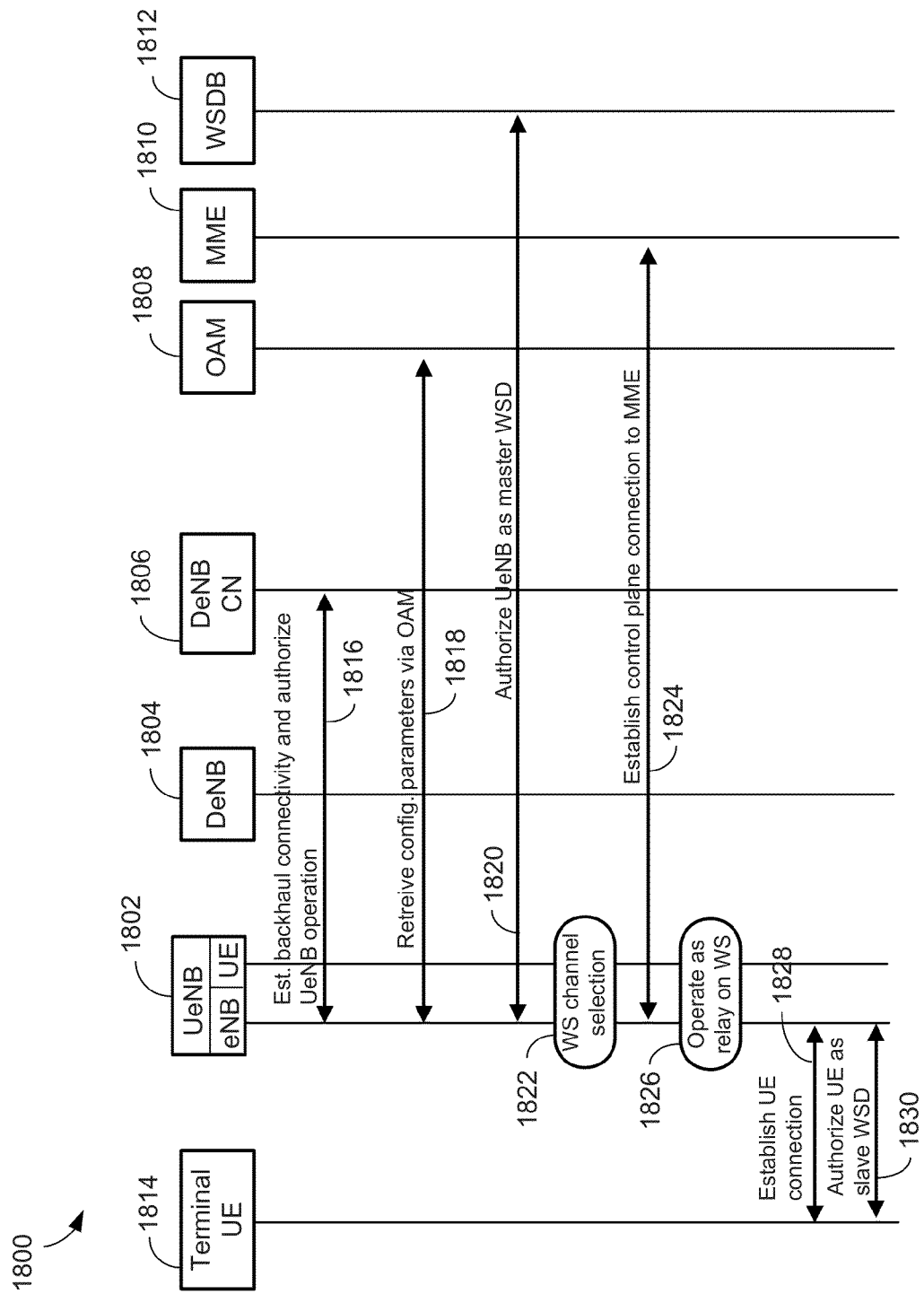
FIG. 18 illustrates an example call flow for UeNB setup for WS access.

UeNB SETUP FOR WS ACCESS: With reference to FIG. 18, there is shown an example call flow 1800 for UeNB setup for WS access. Entities participating in the call flow may include a terminal UE 1814, UeNB 1802, DeNB 1804, DeNB core network 1806, OAM 1808, MME 1810 and WSDB 1812. The setup may include, at 1816, authorization to establish a connection by the UeNB, as defined in 3GPP for a UE in TS 23.401 (e.g., service request). In related aspects, the setup may include, at 1818, OAM configuration, as defined in 3GPP for a eNB in TS 32.593. In further related aspects, the setup may include WS procedures at 1820, 1830 and channel selection at 1822. In yet further related aspects, the setup may include, at 1824, the CN control plane setup, as defined in 3GPP for a eNB in TS 36.413. In still further related aspects, the setup may include, at 1828, authorization to establish a connection by the UE, as defined in 3GPP for a UE in TS 23.401 (e.g., service request).

Figure 19:
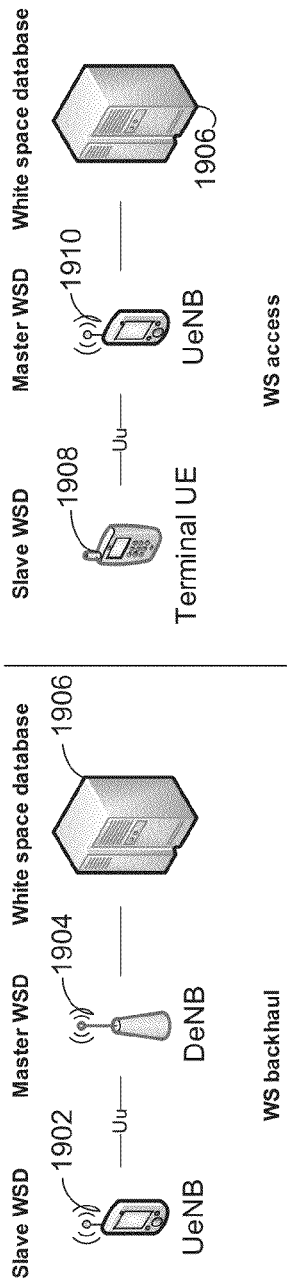
FIG. 19 shows an example architecture reference model for white space operation.

WS OPERATION: With reference to FIG. 19, there is shown a general architecture reference model 1900 for WS operations. When the WS is used for access, the master WS function is in the eNB function of the UeNB, and the slave WS function is in the Terminal UE. When the WS is used for backhaul, the master WS function is in the DeNB, and the slave WS function is in the UE function of the UeNB. WS operation procedures may be performed by both an eNB function and a UE function in order to authorize operation in the WS spectrum based on local regulations.

In related aspects, the eNB may perform the WS operation procedures (see MASTER WSD TO WSDB COMMUNICATIONS, explained in further detail below) before it starts advertising service availability in the WS spectrum. In further related aspects, the UE may perform the WS operation procedures (see SLAVE WSD TO MASTER WSD COMMUNICATIONS, explained in further detail below) in order to start using the WS spectrum for communication.

With continued reference to FIG. 19, the WS network elements 1900 may include a master WSD 1904, 1910, which is a device that consults a WS database 1906 in order to obtain a list of available WS channels at the device's location, and corresponding RF parameters in each available channel, e.g., EIRP. It is noted that, for WS access, the master WSD is a UeNB 1910. For WS backhaul the master WSD is the DeNB 1904. In further related aspects, the WS network elements also include a slave WSD 1902, 1908, which is a device that does not directly communicate with a WS database but is under the control of a master WSD. It is noted that, for WS access, the slave WSD is a terminal UE 1908, whereas, for WS backhaul, the slave WSD is the UeNB 1902. In further related aspects, the WS network elements also include a WS database (WSDB) 1906, which is a device that communicates to a master WSD a location-specific list of available WS channels, and corresponding RF parameters in each available channel, e.g., EIRP.

MASTER WSD TO WSDB COMMUNICATIONS: The master WSD may be authenticated by sending identification parameters (e.g., FCC ID or the like) to the WSDB in order to receive a list of available WS channels to operate in the WS. For example, the identification parameters may include an ID that is defined for and unique to the device and is related to WS operation based on location regulations or the like. In one approach, the master WSD may contact the WSDB in the following instances: (a) when the master WSD initially starts up or attaches to a network; (b) when the master WSD detects that its location has changed sufficiently that it is outside the boundary defined for the list of available WS channels currently in use; and/or (c) when the current list of available WS channels has expired.

Certain procedures may be defined for master WSD to WSDB communications, such as, for example, WSDB discovery (since the master WSD should find the relevant WSDB based on its current location or for another location) and WSDB access (since the master WSD should securely access the relevant WSDB to be authenticated and receive the list of available WS channels).

With respect to WSDB discovery, the spectrum and databases are country specific since the available spectrum and regulations vary from country to country. Thus, the master WSD will need to discover the relevant database based on location. The master WSD should obtain the IP address of the specific WSDB to which it can send queries in addition to authenticating itself for operation and using the available spectrum. The master WSD may be pre-configured with the IP address of a trusted WSDB. In the alternative, or in addition, the master WSD may use the WSDB discovery procedures to find a trusted WSDB at the current location.

The WSDB discovery procedures are expected to be along the following lines of the following. The master WSD may initiate a process to get the IP address of WSDB by forming a fully qualified domain name (FQDN) for the WSDB. The FQDN may be pre-programmed in the master WSD at the factory, may be configured by OAM, or may be formed based on other defined rules. The master WSD may perform DNS query to a public DNS with the FQDN. The DNS may respond to the HeNB with the IP address of the WSDB. It is noted that in order to perform the discovery procedures the master WSD may need to first establish IP connectivity via an approach other than using the WS radio.

With respect to WSDB access, the master WSD should securely access the relevant WSDB to be authenticated for WS operation and receive the list of available WS channels. As part of the access procedure, the master WSD may provide identification, geo-location and any other information required by local regulation. The WSDB access should protect both the channel enablement process and the privacy of users including prevention of device identity spoofing, modification of device requests, modification of channel enablement information, impersonation of registered database services, or unauthorized disclosure of a device's location.

SLAVE WSD TO MASTER WSD COMMUNICATIONS: The slave WSD should be configured to exchange parameters and identification information with the master WSD to operate in WS. Certain procedures may be defined for slave WSD to master WSD communications, such as, for example, WS enablement and WS authorization.

With respect to WS enablement, the master WSD may transmit a WS enabling signal that indicates to a slave WSD that it is capable of enabling WS operations for a slave WSD. The slave WSD may requests authorization from the master WSD that transmits the WS enabling signal to operate in the WS. For example, with reference to FIG. 20 (a first embodiment of WS enablement), there is shown a call flow 2000 for WS initial authorization of the slave WSD 2002 by the master WSD 2004, wherein the UE's WS credentials are stored as part of the subscription information accessed via an MME 2006.

Figure 20:
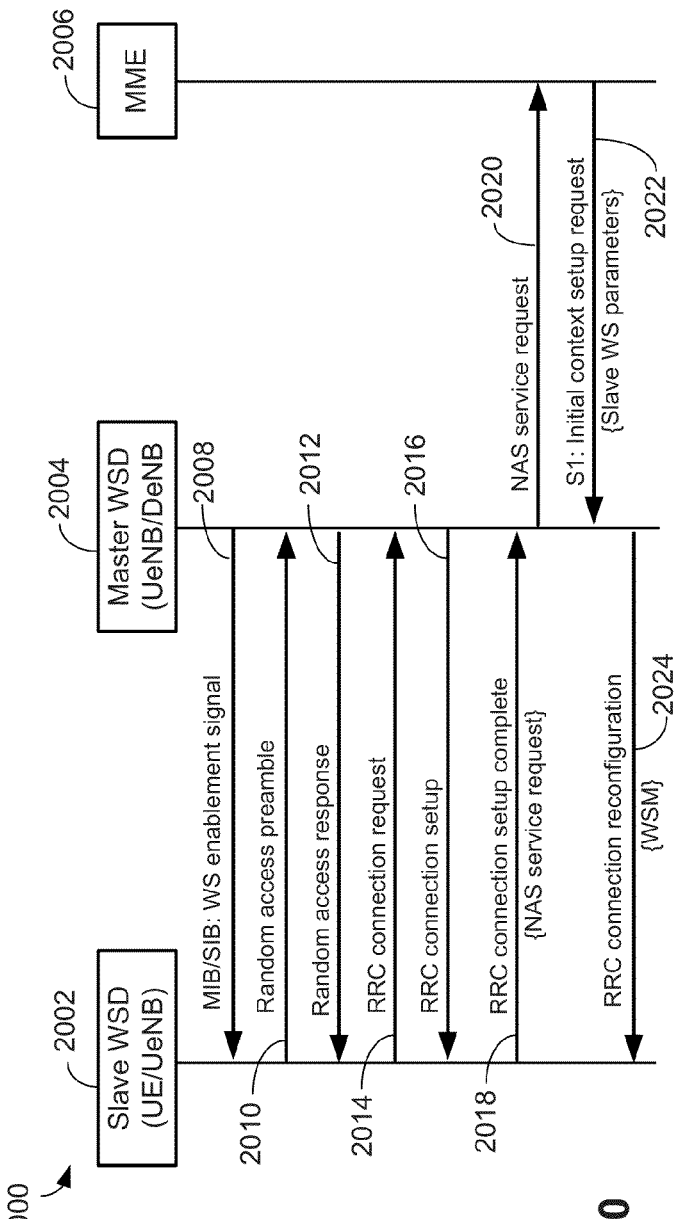
FIG. 20 provides a call flow for an embodiment of WS initial authorization for the slave WSD.

With continued reference to the first embodiment of WS enablement shown in FIG. 20, at 2008, the master WSD may transmit a WS enabling signal that indicates to a slave WSD 2002 that it is capable of enabling WS operations for a slave WSD. For example, the WS enabling signal may be a single bit IE sent in SIB1 or the MIB and may need to be received by the slave WSD before it is allowed to transmit in the WS. In the case of FDD operation, the master WSD 2004 should broadcast the appropriate UL channel, for the UE to use to initiate the RACH procedure. The slave WSD may receive the broadcast WS enablement signal from the master WSD in order to initiate the WS enablement procedures at 2008, for example. At steps 2010-2020, the slave WSD 2002 may perform the normal connection setup procedures with the master WSD and may be authenticated by the MME or the like for service.

At 2022, the MME may include the Slave WS parameters in the S1 Initial Context Setup Request message or the like as part of the UE's context. The slave WS parameters may include an FCC ID or the like that allows the master WSD 2004 to verify that the slave WSD 2002 is eligible for service. At 2024, the master WSD 2004 may accept/reject the slave WSD 2002 using an RRCConnectionConfiguration message or the like. If the master WSD accepts the slave WSD, the slave WSD is enabled for WS operation; otherwise the connection is RRC released.

The RRCConnectionConfiguration message may include a WS Map (WSM) that includes a list of identified available channels, the corresponding maximum allowed transmission powers for each available channel and an expiry timer. The WSM facilitates an efficient channel search since the UE only needs to search those channels listed as part of the WSM. It is noted that the WSM may be sent securely using RRC security. It is also noted that the slave WSD generally transmits on channels identified by the WSM as available for WS operation. It is further noted that the macrocell may, based on local regulations, also advertise a list of available WS frequencies which can be used to improve the search efficiency of the UE. In the alternative, or in addition, the UE may be configured for each region on the available WS frequencies. The WSM received by the master WSD may take precedence for actual WS operation.

In response to the slave WSD having previously been authorized by the master WSD, e.g., due to connection re-establishment due to RLF or the like, the RRCConnection-Configuration message or the like may include a map index to identify a WSM that was sent previously. If the map index is different from the last received map index, the slave WSD may request a new WSM, such as, for example, by setting a field in the RRCWSConfigurationRequest message 2014 or the like. It is noted that, for 802.11af, there may be an additional set of optimizations to manage the WSM by identifying the WSM with an index and enabling partial updating of the list, and similar procedures may be defined for LTE. It is also noted that the WS authorization may need to be periodically repeated by the slave WSD based on an expiry timer in the RRCWSConfiguration message or the like. It is further noted that the WS authorization is generally accepted by the UeNB after the UE is authenticated by the MME.

Figure 21:
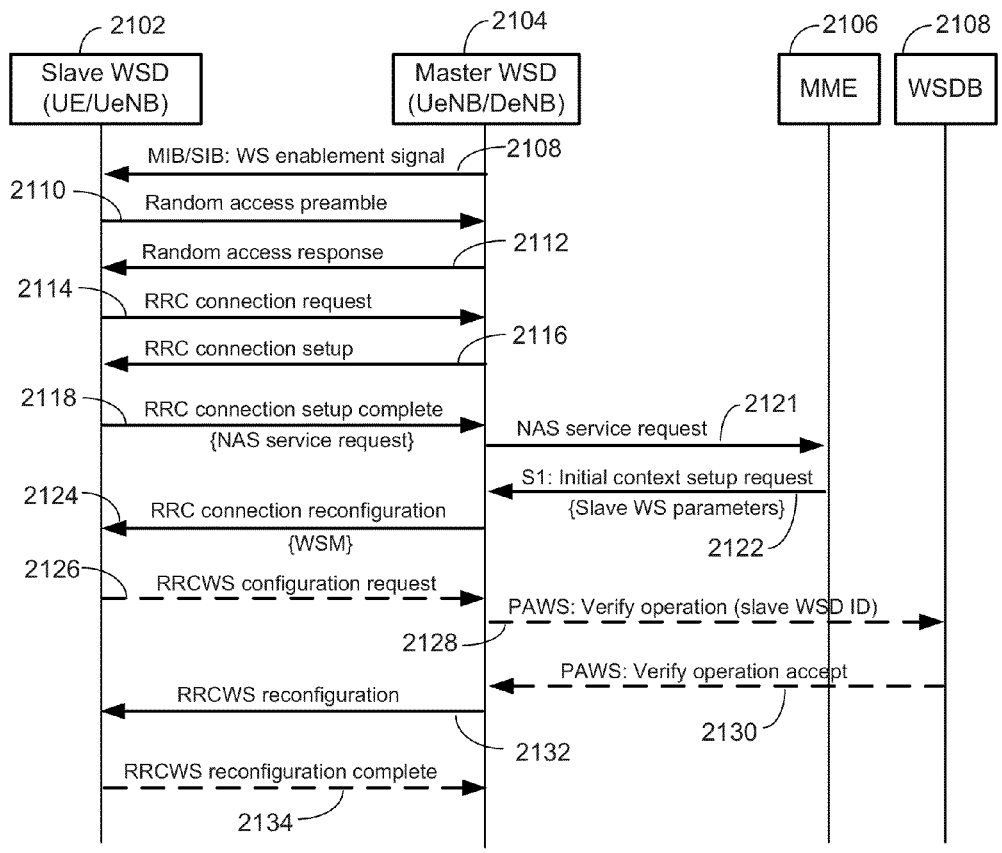
FIG. 21 provides a call flow for another embodiment of WS initial authorization for the slave WSD.

With reference to FIG. 21 (a second embodiment of WS enablement), there is shown a call flow 2100 for WS initial authorization of the slave WSD 2102 by the master WSD 2104 in connection with an MME 2106 and WSDB 2107, wherein the UE provides the WS credentials in RRC message(s). At 2108, the master WSD may transmit a WS enabling signal that indicates to a slave WSD that it is capable of enabling WS operations for a slave WSD, as described above with respect to the analogous 2008 in FIG. 20. Referring once again to FIG. 21, at 2110-2124, the slave WSD 2102 may perform the normal connection setup procedures with the master WSD and may be authenticated by the MME or the like for service.

At 2126, the slave WSD 2102 may request authorization for use of the WS by the master WSD using the RRCWSConfigurationRequest message or the like. In the alternative, the RRCWSConfigurationRequest message is not utilized; rather, the MME may includes the relevant information for WS authorization in the subscription information of the slave WSD in the S1 Initial Context Setup Request or the like. Similarly for HO, the slave WSD may request authorization using the RRCWSConfigurationRequest message or the information needed for authorization is included in the HO request received at the target eNB.

At 2128-2130, based on local regulations, the master WSD 2104 may verify that the slave WSD 2102 is authorized for WS operation with the WSDB. At 2132, the master WSD 2104 may accept/reject the slave WSD 2102 using the RRCWSConfiguration message 2132 or the like, as described above with respect to the analogous 2024 in FIG. 20. Referring once again to FIG. 21, at 2134, the slave WSD 2102 may optionally respond with an RRCWSConfigurationComplete message or the like. It is also noted that the RRCWSConfigurationRequest or the like may alternatively be sent in 2118, and that the RRCWSConfiguration or the like may alternatively be sent in 2124.

With respect to WS authorization, the master WSD may transmits a secure WS enabling signal to the slave WSD to allow it to continue to operate in the WS. In certain geographic regions (e.g., the US), the master WSD should periodically send a message to the slave WSD to verify that it is still within reception range and to validate the available channel list (in the WSM). It is noted that the IE used for this purpose may be referred to as the contact verification signal (CVS), e.g., in FCC regulations and also in 802.11af, and may be sent from the master WSD to the slave WSD periodically (e.g., at least once per minute based on FCC regulations). The CVS should be sent securely and the slave should receive the CVS from the master that enabled it. If the slave does not receive a CVS at the defined time interval (e.g., every 60 seconds) it should start over and request enablement from the original master or another master.

Figure 22:
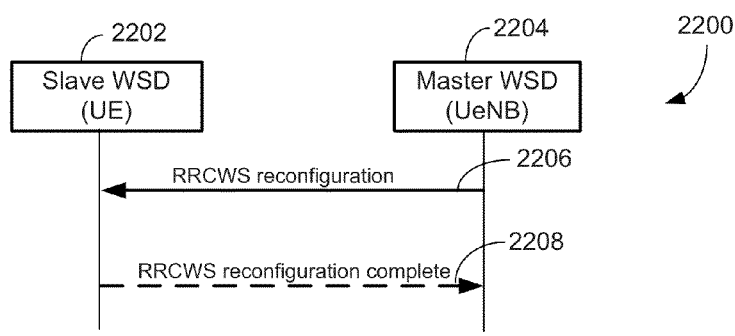
FIG. 22 illustrates an example call flow for WS continued authorization for the slave WSD.

With reference to the example of FIG. 22, there is shown a call flow 2200 for WS continued authorization of the slave WSD 2202 by the master WSD 2204, involving the sending the CVS in RRC. At 2206, the master WSD sends the slave WSD an RRCWS configuration message including the CVS IE. Optionally, the slave WSD 2202 responds at 2208 with an RRCWS reconfiguration complete message. It is noted that, for LTE, since the CVS IE should be sent securely and the slave should receive the CVS IE every 60 second, it makes sense for the UE to perform the WS initial authorization when it transitions from idle to connected mode. After that, the UE may use the WS continued authorization procedure to continue to operate. Such an approach would be preferable over paging the UE to send the CVS IE.

In view of example systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 23:
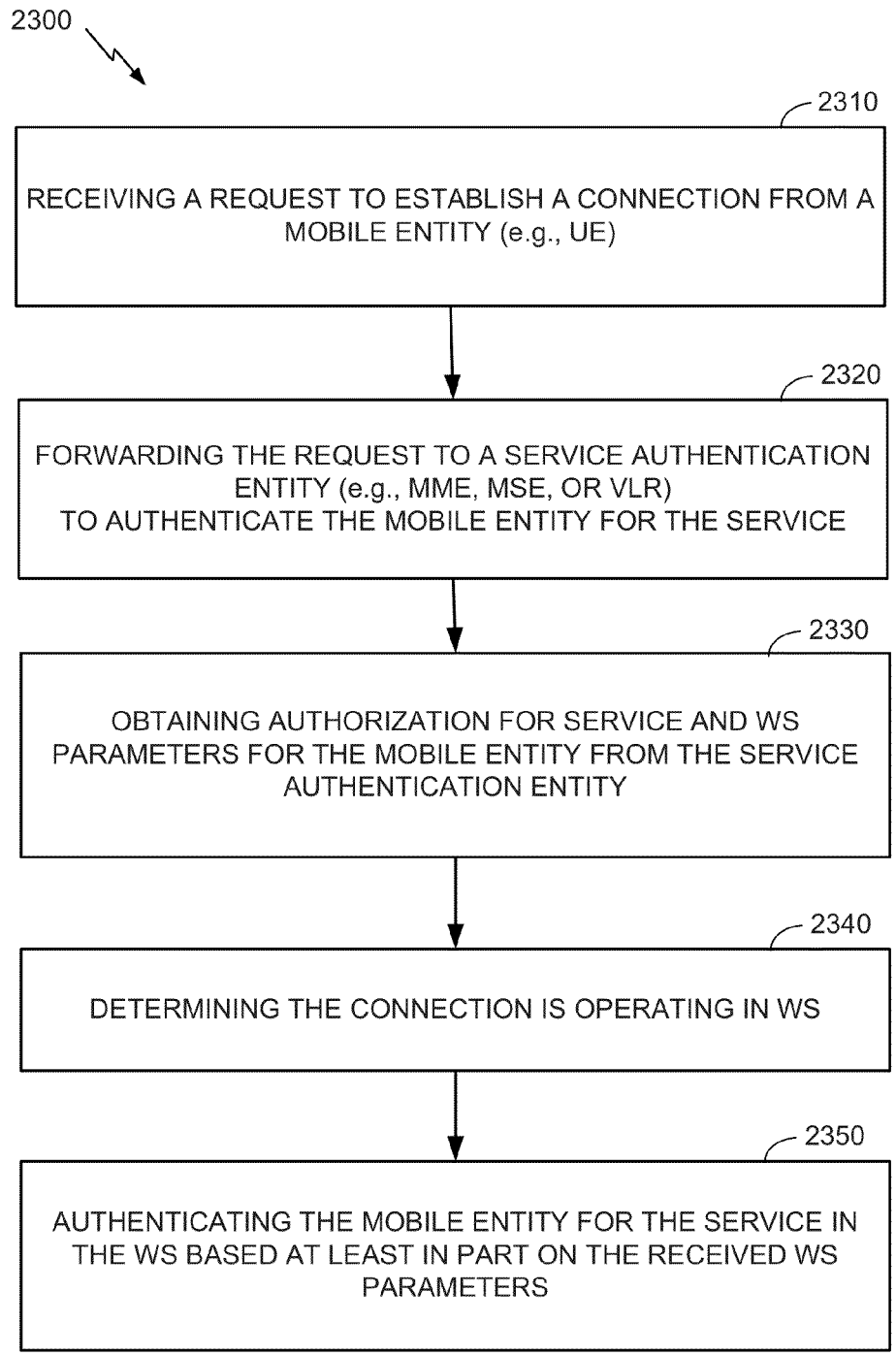
FIG. 23 illustrates an example slave WS authorization methodology executable by a UeNB or other access point.

In accordance with one or more aspects of the embodiments described herein, with reference to FIG. 23, there is shown a methodology 2300, operable by a network entity (e.g., UeNB or the like) for slave WSD authorization. The method 2300 may involve, at 2310, receiving a request to establish a connection from a mobile entity (e.g., UE). The method may include, at 2320, forwarding the request to a service authentication entity to authenticate the mobile entity for the service. The forwarded request may include at least one of (a) a request for the WS parameters for the mobile entity and (b) an indication that the mobile entity requests to operate in the WS.

The method 2300 may include, at 2330, obtaining WS parameters for the mobile entity from a service authentication entity, such as, for example, from an MME, a Mobile Station Equipment (MSE), a Visitor Location Register (VLR), or the like. The method may include, at 2340, determining the connection is operating in WS. The method 2300 may involve, at 2350, authenticating the mobile entity for the service in the WS based at least in part on the received WS parameters.

In related aspects, the received request may comprise a request for an LTE connection establishment. The received request may comprise at least one of a service request, a tracking area update (TAU), and an attach request message.

Figure 24:
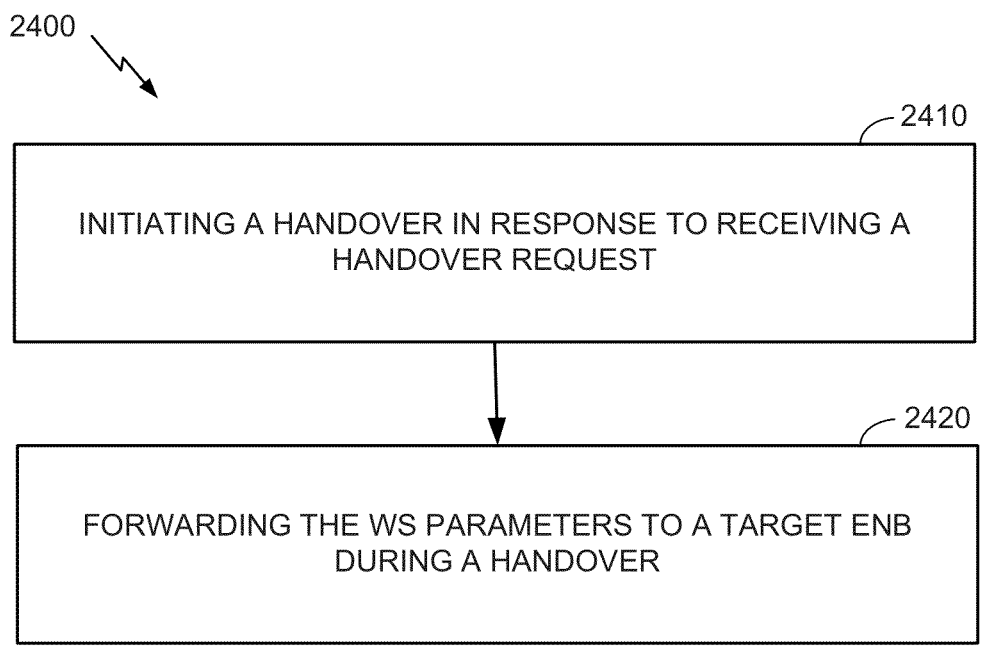
FIG. 24 illustrates further aspects of the methodology of FIG. 23.

In yet further related aspects, the method 2300 may further involve additional operations 2400 as shown in FIG. 24. For example, the method 2300 may include, at 2410, initiating a handover in response to receiving a handover request from a mobile entity. The method 2300 may further include, at 2420, forwarding the WS parameters to a target eNB during a handover.

Figure 25:
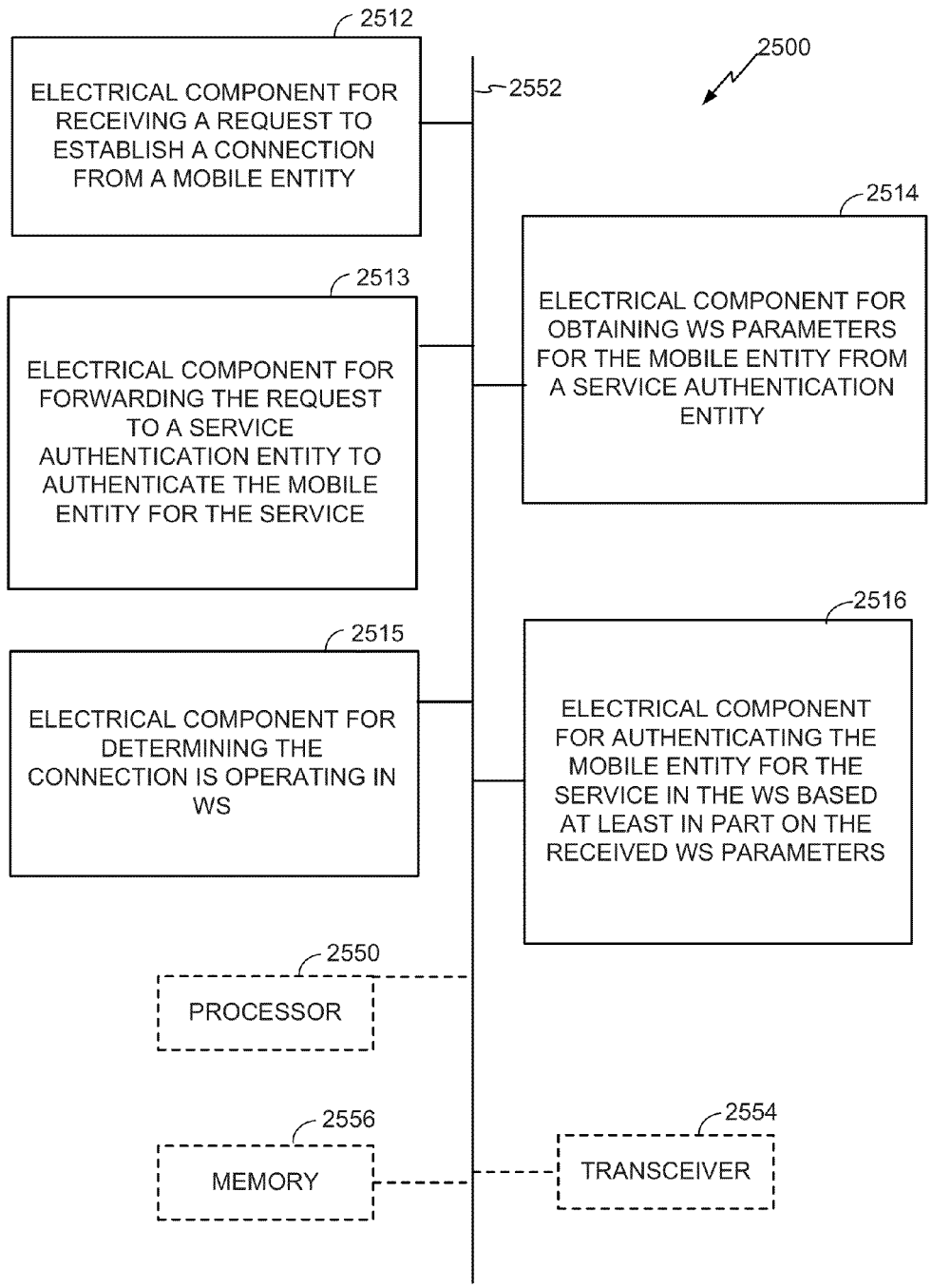
FIG. 25 shows an embodiment of an apparatus for slave WS authorization, in accordance with the methodology of FIG. 23.

In accordance with one or more aspects of the embodiments described herein, FIG. 25 shows a design of an apparatus 2500 (e.g., UeNB or component(s) thereof) for slave WSD authorization, as described above with reference to FIG. 23. For example, the apparatus 2500 may include an electrical component or module 2512 for receiving a request to establish a connection from a mobile entity. The apparatus 2500 may include a component 2513 for forwarding the request to a service authentication entity to authenticate the mobile entity for the service. The apparatus 2500 may include a component 2514 for obtaining WS parameters for the mobile entity from a service authentication entity. The apparatus 2500 may include a component 2515 for determining the connection is operating in WS. The apparatus 2500 may include a component 2516 for authenticating the mobile entity for the service in the WS based at least in part on the received WS parameters.

The components 2512-2516 may comprise means for performing the described functions. More detailed algorithms for accomplishing the described functions is provided herein above, for example, in connection with FIGS. 17-22.

In related aspects, the apparatus 2500 may optionally include a processor component 2550 having at least one processor, in the case of the apparatus 2500 configured as a network entity (e.g., an eNB), rather than as a processor. The processor 2550, in such case, may be in operative communication with the components 2512-2516 via a bus 2552 or similar communication coupling. The processor 2550 may effect initiation and scheduling of the processes or functions performed by electrical components 2512-2516.

In further related aspects, the apparatus 2500 may include a transceiver component 2554 (radio/wireless or wired). A stand alone receiver and/or stand alone transmitter may be used in lieu of or in conjunction with the transceiver 2554. When the apparatus 2500 is a network entity, service authentication entity, a core network entity, or the like, the apparatus 2500 may also include a network interface (not shown) for connecting to one or more network entities. The apparatus 2500 may optionally include a component for storing information, such as, for example, a memory device/component 2556. The computer readable medium or the memory component 2556 may be operatively coupled to the other components of the apparatus 2500 via the bus 2552 or the like. The memory component 2556 may be adapted to store computer readable instructions and data for effecting the processes and behavior of the components 2512-2516, and subcomponents thereof, or the processor 2550, or the methods disclosed herein. The memory component 2556 may retain instructions for executing functions associated with the components 2512-2516. While shown as being external to the memory 2556, it is to be understood that the components 2512-2516 can exist within the memory 2556. It is further noted that the components in FIG. 25 may comprise various components, for example, processors, electronic devices, hardware devices, electronic sub-components, logical circuits, memories, software codes, firmware codes, or any combination thereof.

Figure 26:
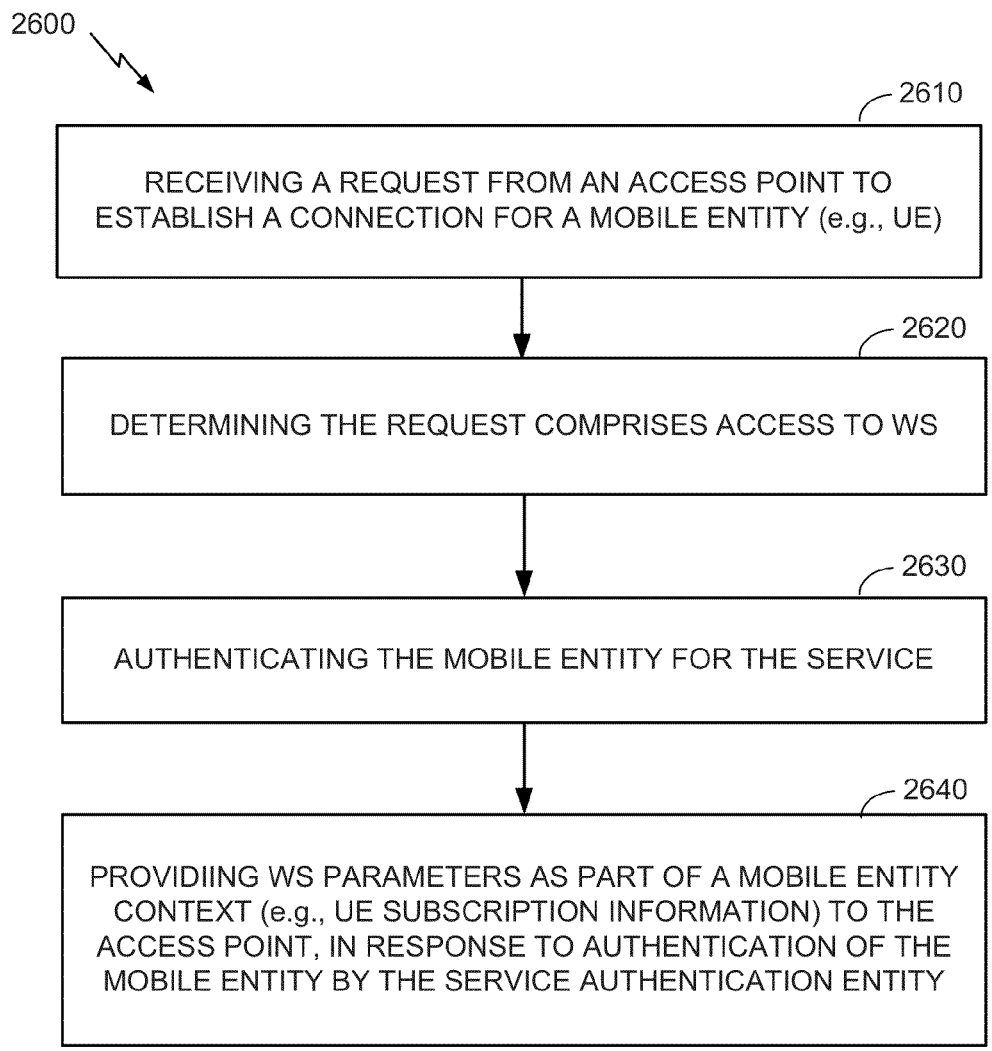

In accordance with one or more aspects of the embodiments described herein, with reference to FIG. 26, there is shown a methodology 2600, operable by a network entity (e.g., MME or the like) for slave WS device authorization. The method 2600 may involve, at 2610, receiving a request to establish a connection for a mobile entity (e.g., UE). The method 2600 may involve, at 2620, determining the request comprises access to WS. The method 2600 may involve, at 2630, authenticating the mobile entity for the service. The method 2600 may involve, at 2640, including WS parameters as part of a mobile entity context (e.g., UE subscription information), in response to authentication of the mobile entity by the service authentication entity.

In related aspects, determining (block 2620) may involve receiving the WS parameters as part of the request. The WS parameters may be sent by at least one of the mobile entity and an access point (AP). In further related aspects, authenticating (block 2630) may involve authenticating the mobile entity for the service in the WS based at least in part on the WS parameters.

Figure 27:
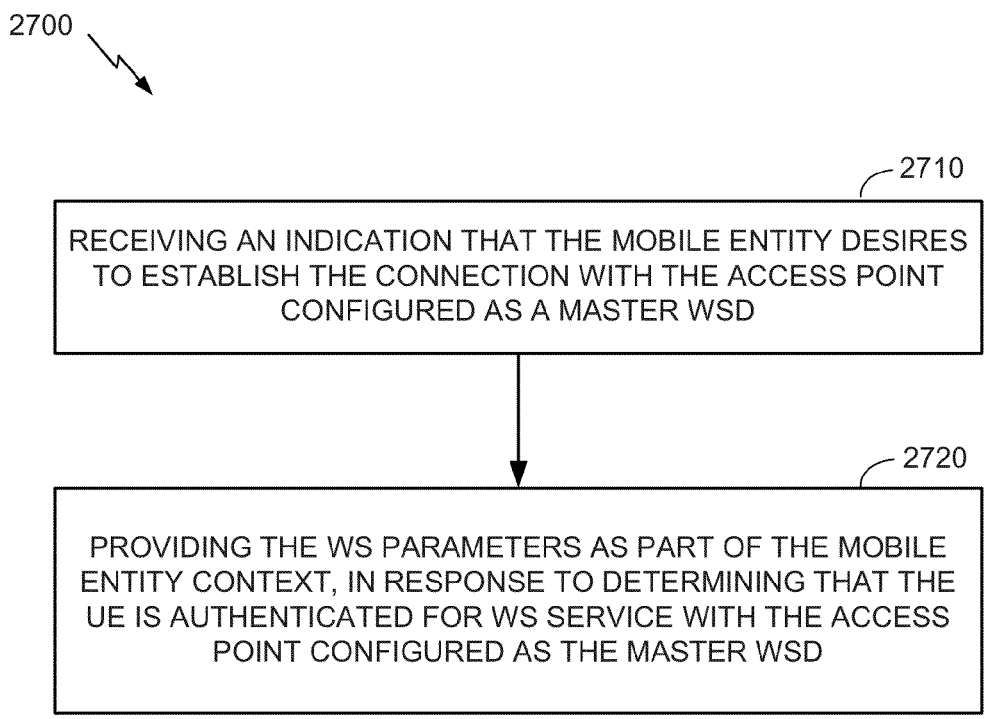
FIG. 27 illustrates further aspects of the methodology of FIG. 26.

In yet further related aspects 2700 shown in FIG. 27, the method 2600 may further include, at 2280, receiving an indication that the mobile entity desires to establish the connection at the master WSD. The method 2600 may further include, at 2720, including the WS parameters as part of a mobile entity context (e.g. UE subscription information), in response to determining that the UE is authenticated for WS service at the master WSD.

Figure 28:
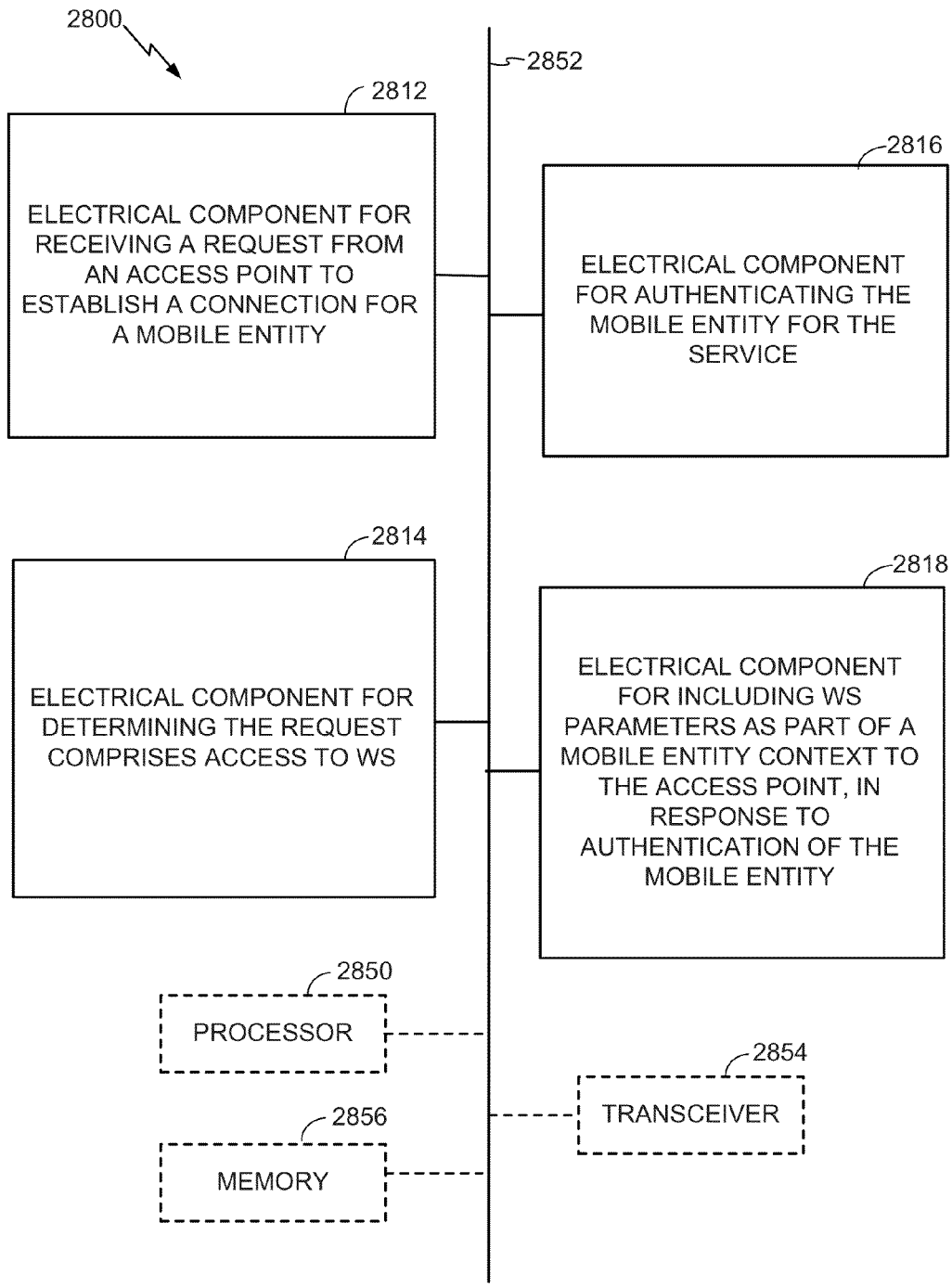
FIG. 28 shows an embodiment of an apparatus for slave WSD authorization, in accordance with the methodology of FIG. 26.

In accordance with one or more aspects of the embodiments described herein, FIG. 28 shows a design of an apparatus 2800 (e.g., MME or component(s) thereof) for slave WS device authorization, as described above with reference to FIG. 26. For example, the apparatus 2600 may include an electrical component or module 2812 for receiving a request to establish a connection for a mobile entity. The apparatus 2600 may include a component 2814 for determining the request comprises access to WS. The apparatus 2600 may include a component 2816 for authenticating the mobile entity for the service. The apparatus 2600 may include a component 2818 for including WS parameters as part of a mobile entity context, in response to authentication of the mobile entity. For the sake of conciseness, the rest of the details regarding apparatus 2800 are not further elaborated on; however, it is to be understood that the remaining features and aspects of the apparatus 2800 are substantially similar to those described above with respect to apparatus 2500 of FIG. 25.

The components 2812-2818 may comprise means for performing the described functions. More detailed algorithms for accomplishing the described functions is provided herein above, for example, in connection with FIGS. 17-22.

Figure 29:
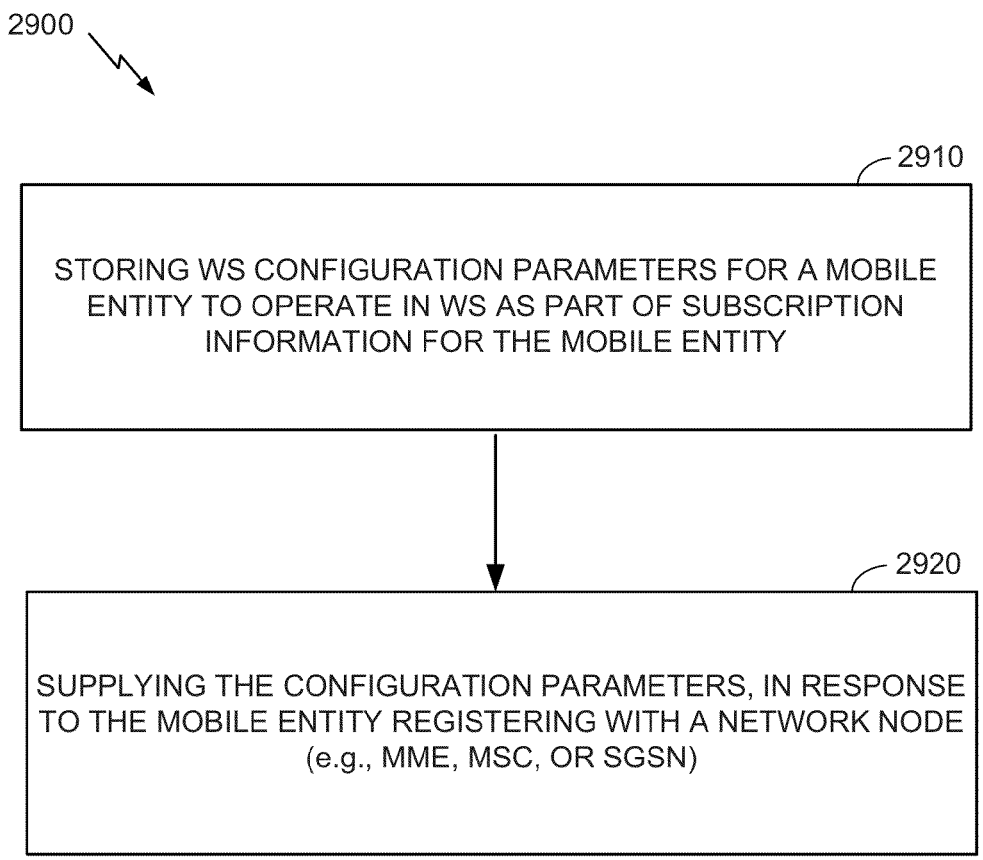
FIG. 29 illustrates an example methodology executable by an MME, an HSS, an HLR or the like, for MME/HSS storage of configuration information.

In accordance with one or more aspects of the embodiments described herein, with reference to FIG. 29, there is shown a methodology 2900, operable by a service authentication entity (e.g., MME, HSS, or home location register (HLR)) for MME/HSS storage of configuration information. The method 2900 may involve, at 2910, storing WS configuration parameters for a mobile entity to operate in WS as part of subscription information for the mobile entity. The method 2900 may involve, at 2920, supplying the configuration parameters, in response to the mobile entity registering with a network node, such as, for example, an MME, mobile switching center (MSC), or a Serving General packet radio service (GPRS) Support Node (SGSN).

Figure 30:
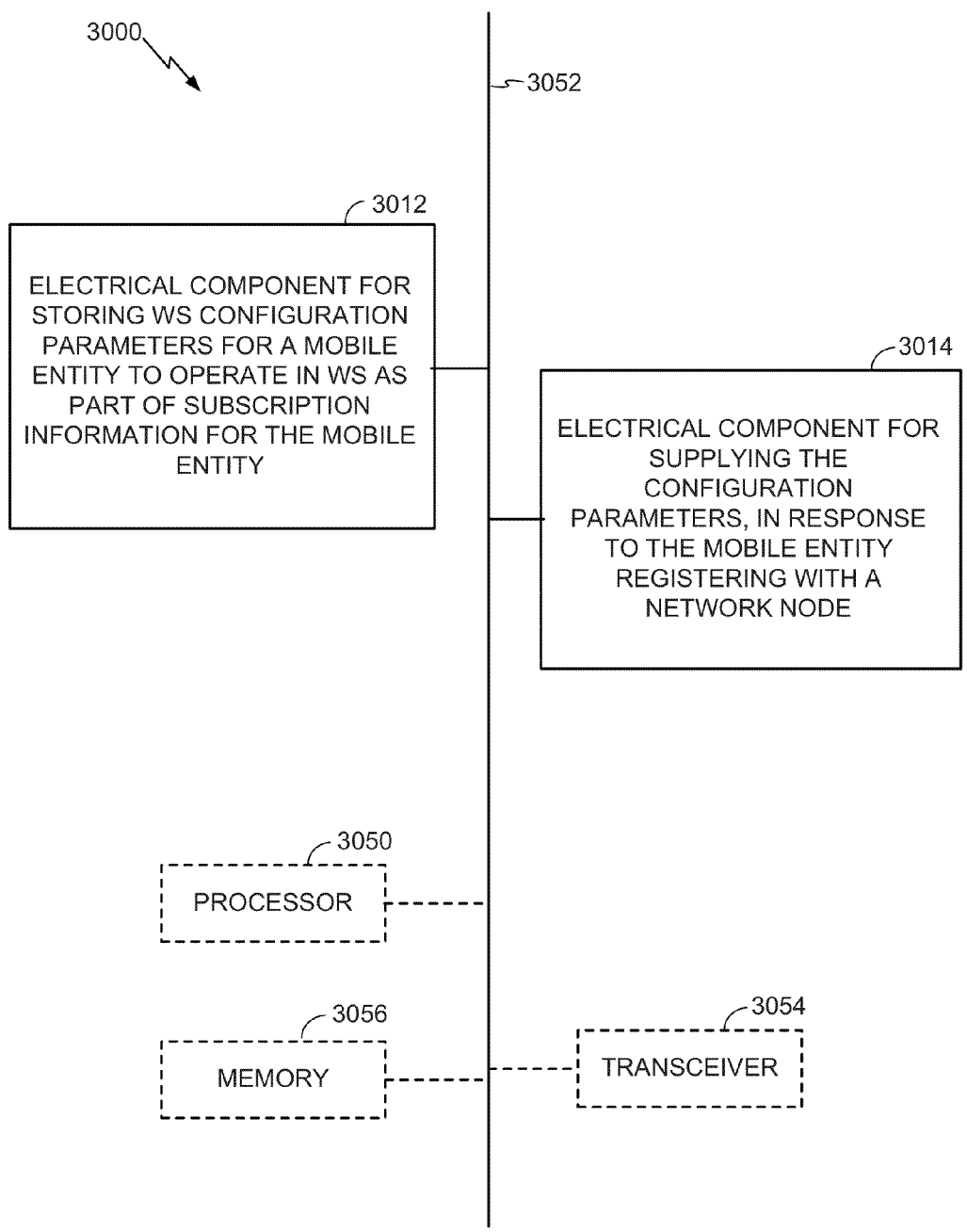
FIG. 30 shows an embodiment of an apparatus for MME/HSS storage of configuration information, in accordance with the methodology of FIG. 29.

In accordance with one or more aspects of the embodiments described herein, FIG. 30 shows a design of an apparatus 3000 (e.g., MME, HSS, or HLR, or component(s) thereof) for MME/HSS storage of configuration information, as described above with reference to FIG. 29. For example, the apparatus 3000 may include an electrical component or module 3012 for storing WS configuration parameters for a mobile entity to operate in WS as part of subscription information for the mobile entity. The apparatus 3000 may include a component 3014 for supplying the configuration parameters, in response to the mobile entity registering with a network node. For the sake of conciseness, the rest of the details regarding apparatus 3000 are not further elaborated on; however, it is to be understood that the remaining features and aspects of the apparatus 3000 are substantially similar to those described above with respect to apparatus 2500 of FIG. 25.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more example designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage medium is a type of a non-transitory medium and may include any available storage medium that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by an access point for wireless communication service, the method comprising:
   receiving a request to establish a connection from a mobile entity;
   forwarding the request to a service authentication entity to authenticate the mobile entity for the service;
   obtaining authorization for service and white space (WS) parameters for the mobile entity from the service authentication entity;
   determining the connection is operating in WS; and
   authenticating the mobile entity for the service in the WS based at least in part on the received WS parameters.

2. The method of claim 1, wherein the received request comprises a request for a Long Term Evolution (LTE) connection establishment.

3. The method of claim 1, wherein the received request comprises at least one of a service request, a tracking area update (TAU), and an attach request message.

4. The method of claim 1, wherein the forwarded request includes at least one of (a) a request for the WS parameters for the mobile entity; (b) an indication that the mobile entity requests to operate in the WS; and (c) an indication that the mobile entity is capable of operating in the WS.

5. The method of claim 1, further comprising forwarding the WS parameters to a target eNB during a handover.

6. An access point for wireless communication service, the access point comprising:
   means for receiving a request to establish a connection from a mobile entity;
   means for forwarding the request to a service authentication entity to authenticate the mobile entity for the service;
   means for obtaining authorization for service and white space (WS) parameters for the mobile entity from the service authentication entity;
   means for determining the connection is operating in WS; and
   means for authenticating the mobile entity for the service in the WS based at least in part on the received WS parameters.

7. An access point for wireless communication service, the access point comprising:
   at least one processor configured to: receive a request to establish a connection from a mobile entity; forward the request to a service authentication entity to authenticate the mobile entity for the service; obtain authorization for service and white space (WS) parameters for the mobile entity from the service authentication entity; determine the connection is operating in WS, and authenticate the mobile entity for the service in the WS based at least in part on the received WS parameters; and
   a memory coupled to the at least one processor for storing data.

8. The access point of claim 7, wherein the at least one processor is further configured for receiving the request comprising a request for a Long Term Evolution (LTE) connection establishment.

9. The access point of claim 7, wherein the at least one processor is further configured for receiving the request comprising at least one of a service request, a tracking area update (TAU), and an attach request message.

10. The access point of claim 7, wherein the at least one processor is further configured for forwarding the request comprising at least one of (a) a request for the WS parameters for the mobile entity; (b) an indication that the mobile entity requests to operate in the WS; and (c) an indication that the mobile entity is capable of operating in the WS.

11. The access point of claim 7, wherein the at least one processor is further configured for forwarding the WS parameters to a target eNB during a handover.

12. A computer program product, comprising:
   a non-transitory computer-readable medium comprising code for causing an access point for wireless communication service to:
      receive a request to establish a connection from a mobile entity;
      forward the request to a service authentication entity to authenticate the mobile entity for the service
      obtain authorization for the service and white space (WS) parameters for the mobile entity from the service authentication entity; and
      authenticate the mobile entity for the service in the WS based at least in part on the received WS parameters.

13. A method operable by a service authentication entity for wireless communication service, the method comprising:
   receiving a request from an access point to establish a connection for a mobile entity;
   authenticating the mobile entity for the service;
   determining the request comprises access to white space (WS); and
   providing WS parameters as part of a mobile entity context to the access point, in response to authentication of the mobile entity by the service authentication entity.

14. The method of claim 13, wherein the mobile entity context comprises subscription information for the mobile entity.

15. The method of claim 13, wherein determining comprises receiving the WS parameters as part of the request.

16. The method of claim 13, wherein determining comprises determining based on an identifier of the access point.

17. The method of claim 13, wherein authenticating comprises authenticating the mobile entity for the service in the WS based at least in part on the WS parameters.

18. The method of claim 13, further comprising:
   receiving an indication that the mobile entity desires to establish the connection with the access point configured as a master white space device (WSD); and
   providing the WS parameters as part of the mobile entity context, in response to determining that the UE is authenticated for WS service with the access point configured as the master WSD.

19. An apparatus for wireless communication service, comprising:
   means for receiving a request from an access point to establish a connection for a mobile entity;
   means for authenticating the mobile entity for the service;
   means for determining the request comprises access to white space (WS); and
   means for providing WS parameters as part of a mobile entity context to the access point, in response to authentication of the mobile entity.

20. An apparatus for wireless communication service, comprising:
   at least one processor configured to: receive a request from an access point to establish a connection for a mobile entity; authenticate the mobile entity for the service; determine the request comprises access to white space (WS); and provide WS parameters as part of a mobile entity context to the access point, in response to authentication of the mobile entity; and
   a memory coupled to the at least one processor for storing data.

21. The apparatus of claim 20, wherein the processor is further configured to include subscription information for the mobile entity in the mobile entity context.

22. The apparatus of claim 20, wherein the processor is further configured to determine the request comprises access to WS at least in part by receiving the WS parameters as part of the request.

23. The apparatus of claim 20, wherein the processor is further configured to determine the request comprises access to WS at least in part based on an identifier of the access point.

24. The apparatus of claim 20, wherein the processor is further configured authenticate the mobile entity for the service in the WS based at least in part on the WS parameters.

25. The apparatus of claim 20, wherein the processor is further configured to:
   receive an indication that the mobile entity desires to establish the connection with the access point configured as a master WSD; and
   provide the WS parameters as part of the mobile entity context, in response to determining that the UE is authenticated for WS service with the access point configured as the master WSD.

26. A computer program product, comprising:
a non-transitory computer-readable medium comprising code for causing a computer to:
   receive a request from an access point to establish a connection for a mobile entity;
   authenticate the mobile entity for a wireless communication service;
   determine the request comprises access to white space (WS); and
   provide WS parameters as part of a mobile entity context to the access point, in response to authentication of the mobile entity.

* * * * *